(12) United States Patent
Kholostov et al.

(10) Patent No.: US 8,044,851 B2
(45) Date of Patent: Oct. 25, 2011

(54) METHOD FOR SUPPRESSING MULTIPATH ERRORS IN A SATELLITE NAVIGATION RECEIVER

(75) Inventors: Mikhail Kholostov, St. Petersburg (RU); Alexander Fedotov, St. Petersburg (RU); Nikolay Mikhaylov, St. Petersburg (RU); Bijan Jalali, Irvine, CA (US)

(73) Assignees: MStar Semiconductor, Inc. (KY); MStar Software R&D (Shenzhen) Ltd., Shenzhen (CN); MStar France SAS, Issy Les Moulineaux (FR); MStar Semiconductor, Inc. (TW)

( * ) Notice: Subject to any disclaimer, the term of this patent is extended or adjusted under 35 U.S.C. 154(b) by 0 days.

(21) Appl. No.: 12/759,902

(22) Filed: Apr. 14, 2010

(65) Prior Publication Data

US 2010/0265133 A1 Oct. 21, 2010

Related U.S. Application Data

(60) Provisional application No. 61/170,120, filed on Apr. 17, 2009.

(51) Int. Cl.
*G01S 19/22* (2010.01)
(52) U.S. Cl. .................................. 342/357.61
(58) Field of Classification Search ............. 342/357.61; 702/190–197
See application file for complete search history.

(56) References Cited

U.S. PATENT DOCUMENTS

| | | | | |
|---|---|---|---|---|
| 5,361,276 | A | * | 11/1994 | Subramanian ................ 375/150 |
| 6,031,881 | A | | 2/2000 | Weill et al. |
| 6,407,699 | B1 | * | 6/2002 | Yang ........................ 342/357.59 |
| 6,633,255 | B2 | | 10/2003 | Krasner |
| 7,436,356 | B2 | | 10/2008 | Bochkovskiy et al. |
| 7,646,830 | B1 | * | 1/2010 | Weill ............................ 375/341 |

OTHER PUBLICATIONS

A.J. Van Dierendonck, et al., Theory and Performance of Narrow Correlator Spacing in a GPS Receiver, Navigation: Journal of the Institute of Navigation, vol. 39, No. 3 (1992), pp. 265-283.
Trefethen, Lloyd N. et al,, Numerical Linear Algebra, "Lecture 23. Cholesky Factorization", (1997), Society for Industrial and Applied Mathematics, pp. 172-175 .
Trefethen, Lloyd N. et al., Numerical Linear Algebra, "Lecture 8. Gram-Schmidt Orthogonalization", (1997), Society for Industrial and Applied Mathematics, pp. 56-59 .

* cited by examiner

*Primary Examiner* — Thomas Tarcza
*Assistant Examiner* — Cassie Galt
(74) *Attorney, Agent, or Firm* — Edell, Shapiro & Finnan, LLC

(57) ABSTRACT

A method of multipath error suppression in a satellite navigation receiver, including steps of navigation satellites signals searching, receiving and processing complex signals from each satellite, tracking found signals with a following-up open loop and determining coordinates, receiver velocity and exact time based on measurements of direct and reflected signal delay and Doppler frequency, the method including: forming, on the basis of navigation parameters, a two-dimensional accumulated power grid, calculating single-path signal corrections using the centered accumulated power grid determining, whether a multipath is presented, and performing, in case of positive result of this determination, improvement of corrections using weights, wherein, performing improvement of corrections using weights is carried out by forming a likelihood function on the basis of a centered accumulated powers vector, and correction is performed according to the found likelihood function global maximum.

10 Claims, 18 Drawing Sheets

METHOD FOR SUPPRESSING MULTIPATH ERRORS IN A SATELLITE NAVIGATION RECEIVER

This application claims the benefit of U.S. Provisional Application No. 61/170,120, filed Apr. 17, 2009, which is incorporated herein by reference in its entirety.

FIELD OF THE INVENTION

The present invention relates to satellite radio navigation, and more particularly to methods of obtaining pseudo-range and pseudo-velocity measurements at multipath conditions in navigating receivers of Global Navigating Satellite System (GNSS).

BACKGROUND

Several GNSSs exist or are created in the world. Those are live systems: Global Positioning System (GPS, USA), Global Navigating Satellite System (GLONASS, Russian Federation), Galileo (European Space Agency, ESA) which is under creation, and BeiDou or Compass (Peoples Republic of China). The present invention can be used in navigation receivers of all of these or other GNSSs.

Using navigation receivers in urban canyon conditions results in frequent missing a line-of-sight of satellites. Power of received signals thus becomes low or vanishes. In these conditions, traditional autonomous signal tracking in a close-loop system by means of delay lock loop (DLL) and a frequency lock loop (FLL) is often interrupted.

Tracking satellite signals in an open-loop system ("Open-Loop Tracking", [U.S. Pat. No. 6,633,255]) is realized by means of calculating, for each satellite, predictions of delay and Doppler frequency measurements based on navigation solution, forming two-dimensional (delay and Doppler frequency) power grid with the center defined by the forecast of measurements, obtaining corrections for the prediction, and forming measurements as the sums of corrections and the prediction. Such tracking ensures operation for low signal/noise ratios.

The signal loss from a part of satellites in the system realizing tracking in an open loop is not critical while navigation solution exists, i.e., measurements remain based on signals from at least 3-4 satellites.

Presence of signals coming by direct and reflected paths results in occurrence both of delay and Doppler frequency errors. FIG. 1 illustrates the exemplary diagram of multipath signal propagation, results in distortions of measurements:

for a static receiver or receiver moving in parallel with reflecting surface (FIG. 1a), delay measurement errors occur only, because rates of change of distance to a satellite for direct and reflected paths are equal;

for a receiver moving in the direction of a reflecting surface (FIG. 1b), delay measurement errors are added to Doppler frequency measurement errors, because in this case rate of change of distance to the satellite by a reflected path differs from rate of change of distance to the satellite by a direct path.

Methods are known which provide reduction of pseudorange measurement errors resulting from presence of reflected paths. They are generally: a narrow correlator [Theory and Performance of Narrow Correlator Spacing in a GPS receiver. A. J. van Dierendonck, Pat Fenton, Tom Ford. Journal of The Institute of Navigation, Vol. 39, No. 3, 1992.], strobe methods for replica forming for a pseudo-random sequence (PRS) of a signal by way of calculation of autocorrelation function (ACF) [U.S. Pat. No. 7,436,356, filed 24 Mar. 2006], methods based on the usage of ACF leading edge, calculation of pieces crossing on leading and trailing edges and ACF samples weighting [U.S. Pat. No. 7,436,356, filed 24 Mar. 2006]. These methods are easily realized in inexpensive mass produced receivers and reduce a pseudorange error, but their accuracy is not high.

Also known are multipath mitigation methods based on optimum processing of the multipath signal including measurement of signal parameters for direct and reflected paths with applying a method of maximum likelihood. Suppression of the reflected signals effect is realized by optimum estimating and exception of reflected signals from observations. These methods are used in high cost geodetic receivers and demand considerable expensive hardware for its realization.

Usage of adaptive antenna array for suppression of signals coming by reflected paths requires several receive antennas and additional processing of signals received by them, which also complicates consumer equipment considerably.

The closest to the claimed solution is the method described in the U.S. Pat. No. 6,031,881, published Feb. 2, 2000. Disadvantages of this method consist in necessity of saving input signal samples, quantized in a high frequency (in the patent the sampling rate is indicated as equal 20 MHz for GPS system), as well as in processing these samples in real-time. For realization of such method a great volume of memory and a high rate of processing information are required.

Other disadvantage is limited accumulation time. The reason of limiting accumulation time is modulation of a received signal by unknown data bits of the navigation message in a transmitted signal (every 20 ms for GPS and GLONASS), which leads to limiting the received ratio of carrier signal power C to noise power $N_0$ in the band of 1 Hz $C/N_0 > 30$ dB Hz.

SUMMARY OF THE INVENTION

An object of the proposed invention is to eliminate multipath influence on measurements of delays and Doppler frequencies, and to create a method, which is efficient for weak signals and does not require great computing capabilities for its realization. Distinguished technical effect consists in providing bit-synchronous forming an accumulated power grid and suppressing multipath errors by way of construction of a likelihood function with exception of nuisance parameters.

The task in view is solved as follows.

The method of suppressing multipath errors in a satellite navigation receiver includes steps of searching signals of navigation satellites, receiving and processing complex signals from each satellite, tracking the found signals with a following-up open loop and determining coordinates, velocity of the receiver and an exact time based on measurements of a signal delay and Doppler frequency for direct and reflected paths according the following:

based on navigation parameters including coordinates, receiver velocity and exact time, and also information about movement of the satellite, which information obtained on the basis of measured time and received ephemerides, delay and Doppler frequency predictions are calculated for orientation of a two-dimensional accumulated power grid by delay and Doppler frequency, which grid is formed on the basis of received and processed complex signals. At the same time, in the course of forming grid elements, summation of a complex signal is carried out within an interval of coherent integration synchronously with data bits of the given satellite, wherein the time of coherent integration is matched with a bit length. On the basis of processing the grid of accumulated powers, which grid includes its centering, corrections are calculated for delay and Doppler frequency predictions, and delay and Doppler frequency measurements are calculated as sums of predictions and corresponding corrections. After that, extrapolation of received measurements for the preset moment of time is carried out, and calculation of pseudorange and pseudorate measurements is carried out, and on the basis of measurements received from all satellites, coordinates and receiver velocity are defined. Calculation of delay and Doppler frequency corrections comprises:

calculating corrections of a single-path signal using a centered accumulated power grid, revealing whether multipath exists, and in case of positive result of said revealing, carrying out corrections improvement using weights, at the same time, corrections improvement is carried out by forming a likelihood function on the basis of centered accumulated powers vector, and correction is carried out according to the found global maximum of a likelihood function.

Forming the likelihood function on the basis of centered accumulated powers vector can be carried out with various methods, for example, with two methods described below.

According to the first method, forming the likelihood function on the basis of centered accumulated powers vector comprises the following substeps:

calculating weighted sums for each vector using vectors of weights corresponding to predicted signal delays for direct and reflected paths, obtaining inverse matrices of the matrices constructed on the basis of pairwise scalar products of vectors of weights, and calculating the likelihood function as quadratic form with results of the first and second substeps.

According to the second method, forming the likelihood function on the basis of centered accumulated powers vector comprises the following substeps:

calculating weighed sums for each vector using orthonormalized vectors of signals depending on signal delays of direct and reflected paths, calculating the likelihood function by calculating the sum of squares of the obtained weighed sums.

Forming the likelihood function for reduction of Doppler frequency measurement errors is carried out similarly.

In the first case forming the likelihood function comprises the following substeps:

calculating the weighed sums for each vector using vectors of weights corresponding to predicted signal Doppler frequencies of direct and reflected paths, obtaining inverse matrices of the matrices constructed on the basis of pairwise scalar products of vectors of weights, and calculating the likelihood function as quadratic form with results of the first and second substeps.

In the second case:

calculating the weighed sums for each vector using orthonormalized vectors of signals depending on Doppler frequencies of signals of direct and reflected paths, calculating the likelihood function by calculating the sum of squares of obtained weighed sums.

DESCRIPTION OF THE PREFERRED EMBODIMENT

Disclosed below is an example of implementation of the invention.

Figure 2:
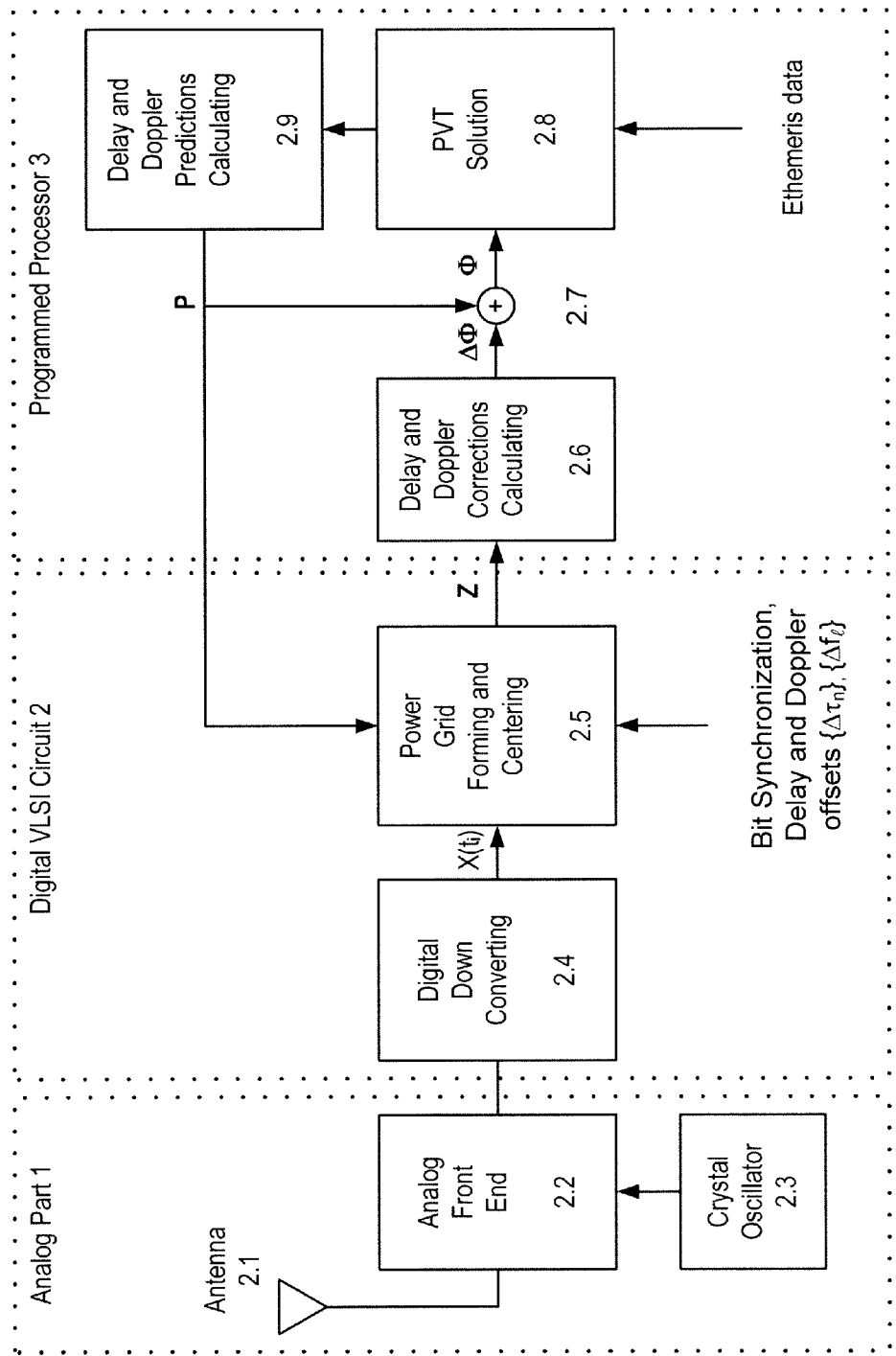
FIG. 2 illustrates a block scheme of a navigation receiver with tracking in an open loop system.

A block scheme of a typical GNSS receiver with tracking in an open loop system is shown in FIG. 2.

Signal processing in a typical navigation receiver is divided on analogue (unit 1) and digital (units 2, 3) parts. A part of digital signal processing requiring high rate of computation, and not requiring complex processing algorithms, is performed by a digital very large scale integrated (VLSI) circuit 2. Other part requiring complex processing algorithms at low rate is performed, as a rule, by programmed processor 3.

Radio frequency electromagnetic signals received by an antenna (2.1) are converted in electric signals and amplified. Then, analogue radio frequency transformation is carried out in step 2.2, namely, transferring from radio frequency to intermediate frequency is carried out, and also analogue signal discrete sampling by time and its quantization by level are carried out. The reference frequency obtained in step 2.3 by means of a crystal oscillator is used for transferring and discrete sampling. Then, a digital signal is digitally transferred with frequency downconversion in step 2.4. For this purpose, the digital signal is transferred to nearest to zero frequency, limited by spectrum in a preset frequency band and downconverted according to Nyquist frequency. This signal $X(t_i)$ is a digital complex signal with limited digit capacity in view of memory economy. It comprises an additive mix of received from satellites signals and noise. Then, the obtained complex signal $X(t_i)$ is used in step 2.5 to forming and centering a grid Z of accumulated powers. Also to forming a grid of accumulated powers used are delay and Doppler frequency predictions: $P=(\tau_p, f_p)^T$, where P—vector of predictions, $\tau_p$—delay prediction, $f_p$—Doppler frequency prediction, and offset values of elements of accumulated power grid relatively prediction of delay $\{\Delta\tau_n\}$ and Doppler frequency $\{\Delta f_l\}$.

Then, in step 2.6, on the basis of the centered grid Z of accumulated powers, calculation of delays and Doppler frequencies corrections $\Delta\Phi$ (relatively predictions) is carried out:

$$\Delta\Phi = (\Delta\tau_p, \Delta f_p)^T,$$

where: $\Delta\tau_p$—delay correction,
$\Delta f_p$—Doppler frequency correction.

In step 2.7, obtained corrections are added with delay and Doppler frequency predictions to obtain delay and Doppler frequency measurements:

$$\Phi = P = \Delta\Phi,$$

where: $\Phi = (\tau, f)^T$—vector of measurements of delay $\tau$ and Doppler frequency f.

Obtained delay and Doppler frequency measurements $\Phi$ serve together with data on a satellite trajectory and velocity (ephemerides) for determination of receiver position, velocity and time in step 2.8 (at that, calculation of pseudorange and pseudovelocity on the basis of delay and Doppler frequency measurements is carried out using a standard method). In step 2.9, on the basis of obtained coordinates, velocity and time, and also data on a trajectory and velocity of a satellite, calculation of delay and Doppler frequency measurements predictions P is performed.

Steps 2.2 and 2.3 are carried out in the analogue part 1, steps 2.4 and 2.5 are carried out in the VLSI circuit 2, steps 2.6-2.9 are carried out in the programmed processor 3.

The system with open loop tracking ensures safe operation for weak signals with carrier power to noise power ratio in the band of 1 Hz: $C/N_0 > 10$ dB Hz, where C—carrier power, $N_0$—noise power in the band of 1 Hz.

Figure 3:
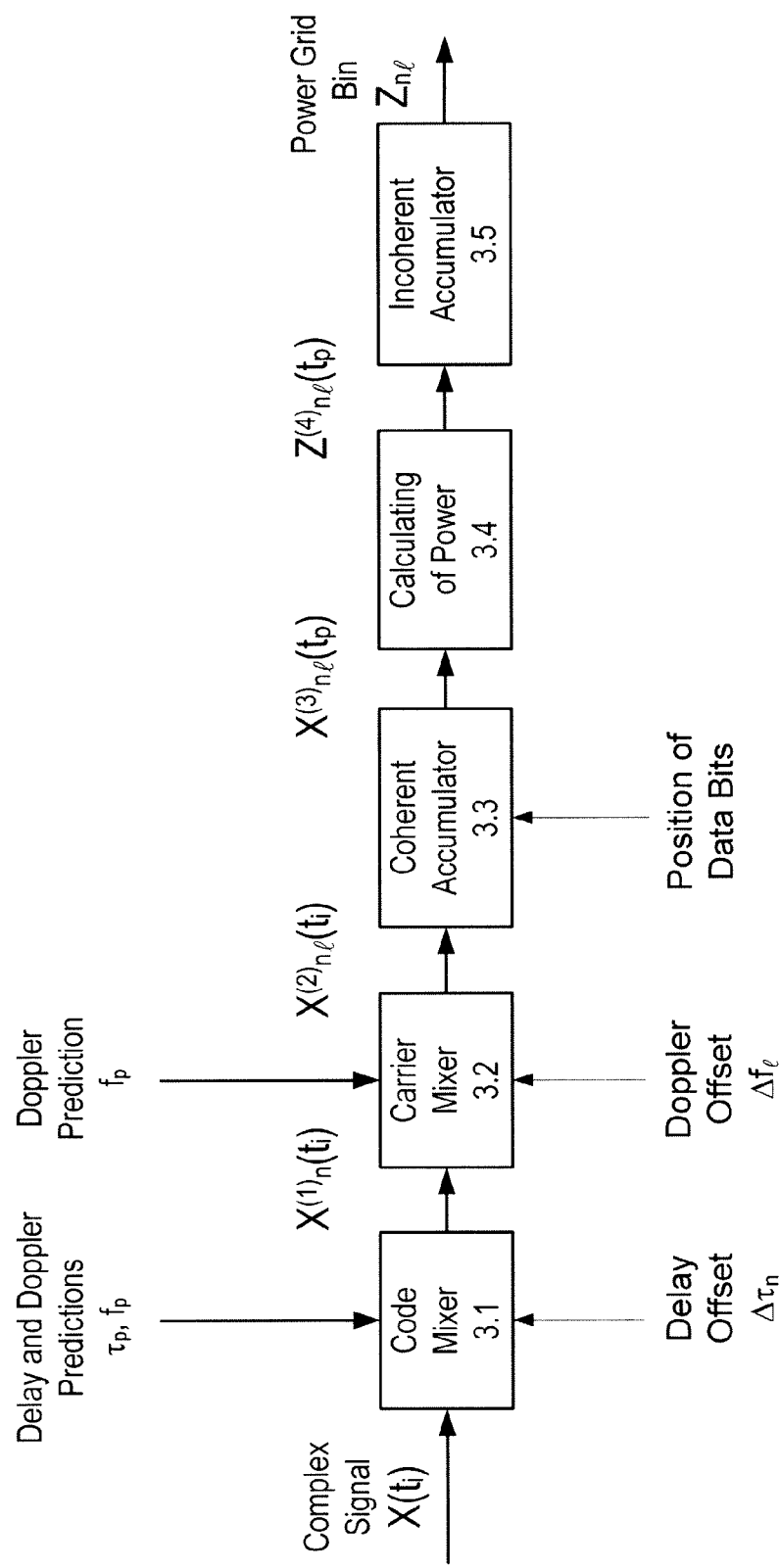
FIG. 3 illustrates a flow chart of forming one bin of an accumulated power grid.

A flow chart of forming one bin of the accumulated power grid with index n,k (n—delay number, k—Doppler frequency number) is represented on FIG. 3.

A code mixer (step 3.1) carries out multiplication of complex signal samples by values of real replica of a code:

$$X_n^{(1)}(t_i) = X(t_i) * C_p\left(\frac{t_i - \tau_n^{mix}}{1 - \frac{f_p}{F}}\right), \quad (1)$$

where:
$X_n^{(1)}(t_i)$—a complex signal from an output of n-th code mixer,
$X(t_i)$—sample of a complex signal from an output of step 2.4,
 i—number of a complex signal sample,
 $t_i = \delta * i$—time of i-th signal sample,
 $\delta$—sampling interval,
 $C_p(\tau)$—value of the signal code replica at the moment of time t,
 $\tau_n^{mix} = \tau_p + \Delta\tau_n$—a replica delay of the signal for n-th code mixer, $\tau_p$—a delay prediction,
$\Delta\tau_n$—an offset value for n-th code mixer,
$f_p$—Doppler frequency prediction,
F—radio frequency of carrier.

A carrier mixer (step 3.2) performs multiplication of a complex signal at the output of code mixer 3.1 by a complex exponent:

$$X_{nl}^{(2)}(t_i) = X_n^{(1)}(t_i) * e^{-j*2\pi*f_l^{mix}*t_i}, \quad (2)$$

where:
$X_{nl}^{(2)}(t_i)$—a complex signal at the output of n-th carrier mixer and n-th code mixer,
j—imaginary unit,
$f_l^{mix} = f_p + \Delta f_l$—Doppler frequency value for l-th carrier mixer,
$f_p$—Doppler frequency prediction,
$\Delta f_l$—a frequency offset value for l-th carrier mixer.

A coherent accumulator (step 3.3) carries out summation of a complex signal in the interval of coherent integration $T_{coh} = N_{coh} * \delta$ synchronously with data bits of the given satellite, wherein the time of the coherent integration is matched with a bit length (20 ms for GPS and GLONASS systems):

$$X_{nl}^{(3)}(\tau_p) = \sum_{i=(p-1)*Ncoh}^{p*N_{coh}} X_{nl}^{(2)}(t_i) \quad (3)$$

where:
$X_{nl}^{(3)}(\tau_p)$—a complex signal at the output of a coherent integrator in p-th coherent accumulation interval,
$\tau_m = \delta * N_{coh} * p$—time of p-th coherent accumulation interval,
$N_{coh}$—sample quantity of a complex signal in a coherent accumulation interval.

A power calculation unit (step 3.4) calculates a square of a complex signal module from an output of the coherent integrator:

$$Z_{nl}^{(4)}(\tau_p) = Re^2[X_{nl}^{(3)}(\tau_p)] + Im^2[X_{nl}^{(3)}(\tau_p)], \quad (4)$$

where:
$Z_{nl}^{(4)}(\tau_p)$—real signal power in p-th interval of coherent accumulation,
Re( ), Im( )—real and imaginary parts of a complex signal.

As the complex signal at the output of the coherent integrator $X^{(3)}_{nl}(\tau_p)$ is synchronized with data bits, power of this signal does not depend on change of a sign of data in the signal.

An incoherent accumulator (step 3.5) adds powers in the interval of incoherent accumulation $T_{inc} = T_{coh} * N_{inc}$:

$$Z_{nl} = \sum_{p=0}^{N_{inc}} Z_{nl}^{(4)}(t_p) \quad (5)$$

where:
$Z_{nl}$-signal power at the output of the incoherent integrator in one interval of incoherent accumulation,
$N_{inc}$-quantity of samples of real signal powers in an interval of incoherent accumulation.

Figure 1A:
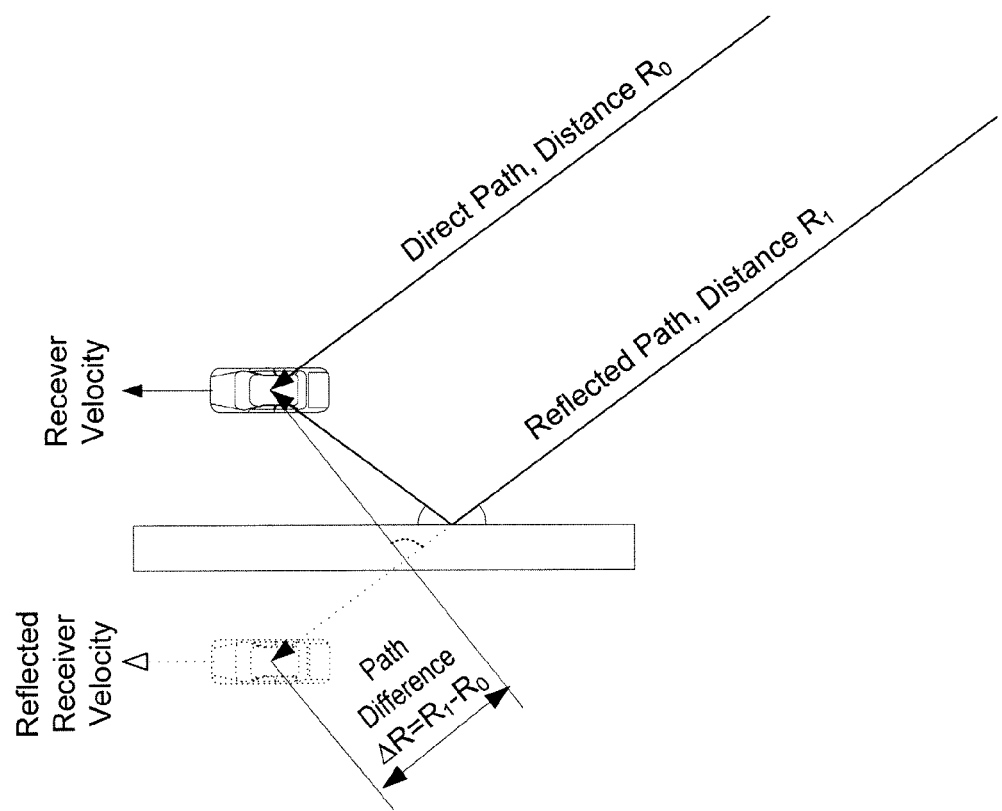
FIGS. 1a and 1b illustrate a diagram of multipath signal propagation leading to distortions of, respectively, a) delay only, b) Doppler shift and delay.
Figure 4:
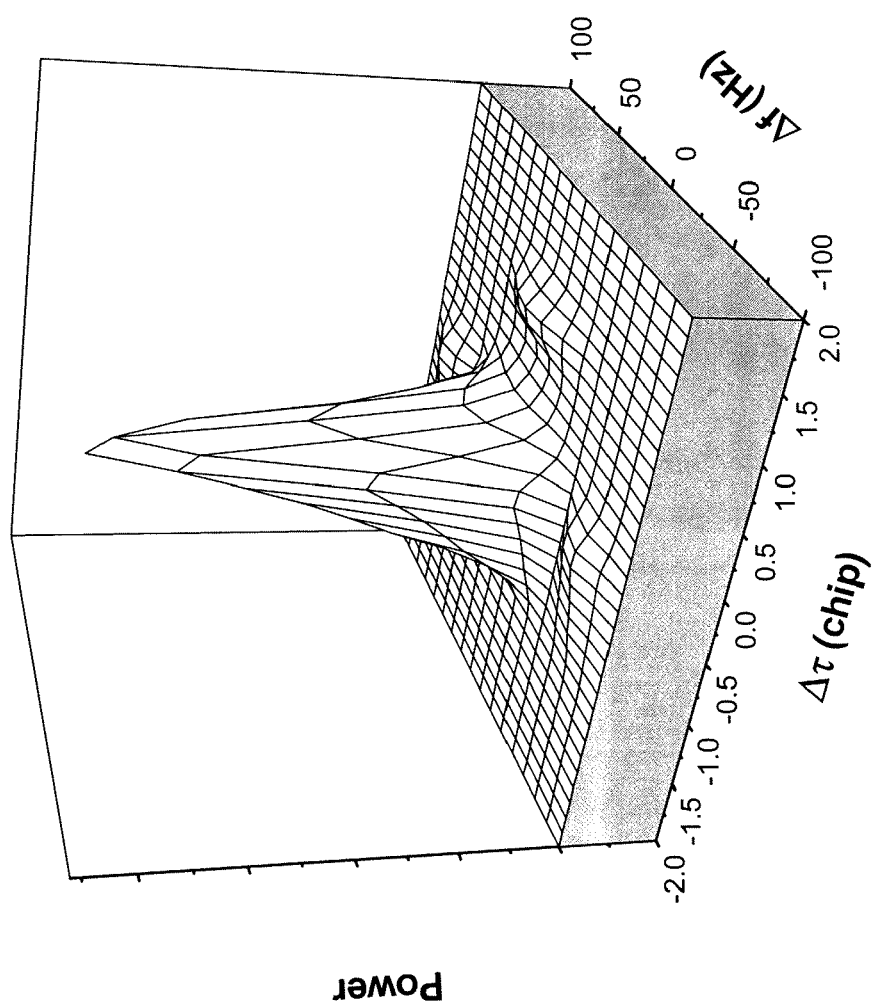
FIG. 4 illustrates an example of a two-dimensional grid of accumulated powers generated as a result of receiving a multipath signal.

Similar steps are performed for calculation of each element of accumulated powers with other delay $\Delta\tau_n$ and Doppler frequency $\Delta f_l$ offset values relatively predictions. The example of an accumulated power grid resulted from receiving a multipath signal, which differs from a reflected signal in a delay only (see FIG. 1*a*)), is shown on FIG. 4.

Calculated accumulated powers are the sum of signal and noise powers. Unknown noise power is a nuisance parameter. For elimination of accumulated noise power, a part of elements of an accumulated power grid, which does not comprise a signal, is used for compensation of this noise power, or centering.

Figure 5:
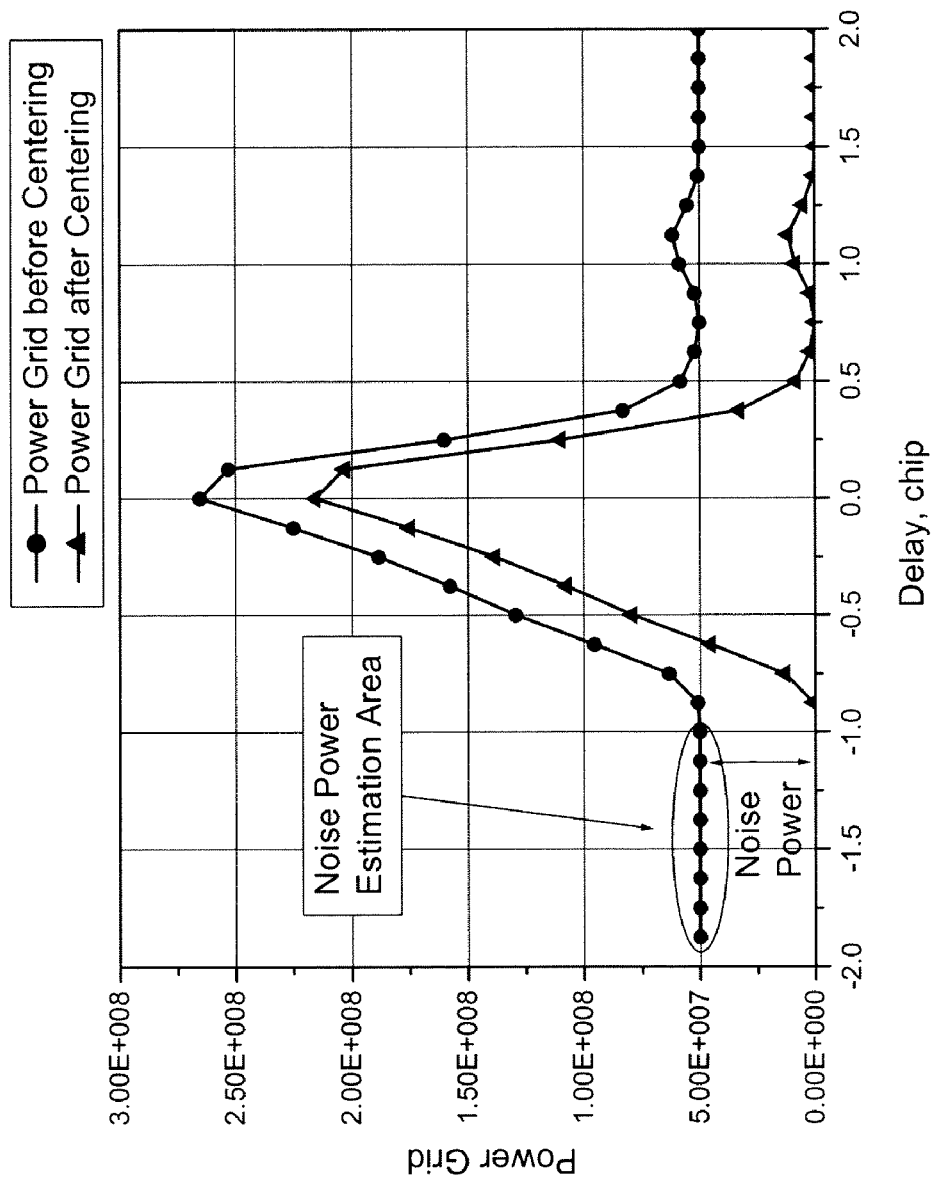
FIG. 5 illustrates a power grid corresponding to Doppler frequency with maximum signal power, before and after centering.

FIG. 5 illustrates an accumulated power grid corresponding to one Doppler frequency of a signal peak before and after centering. Here, elements of accumulated power grid in the field of delays smaller than a delay of a direct signal are used for a centering.

Figure 6:
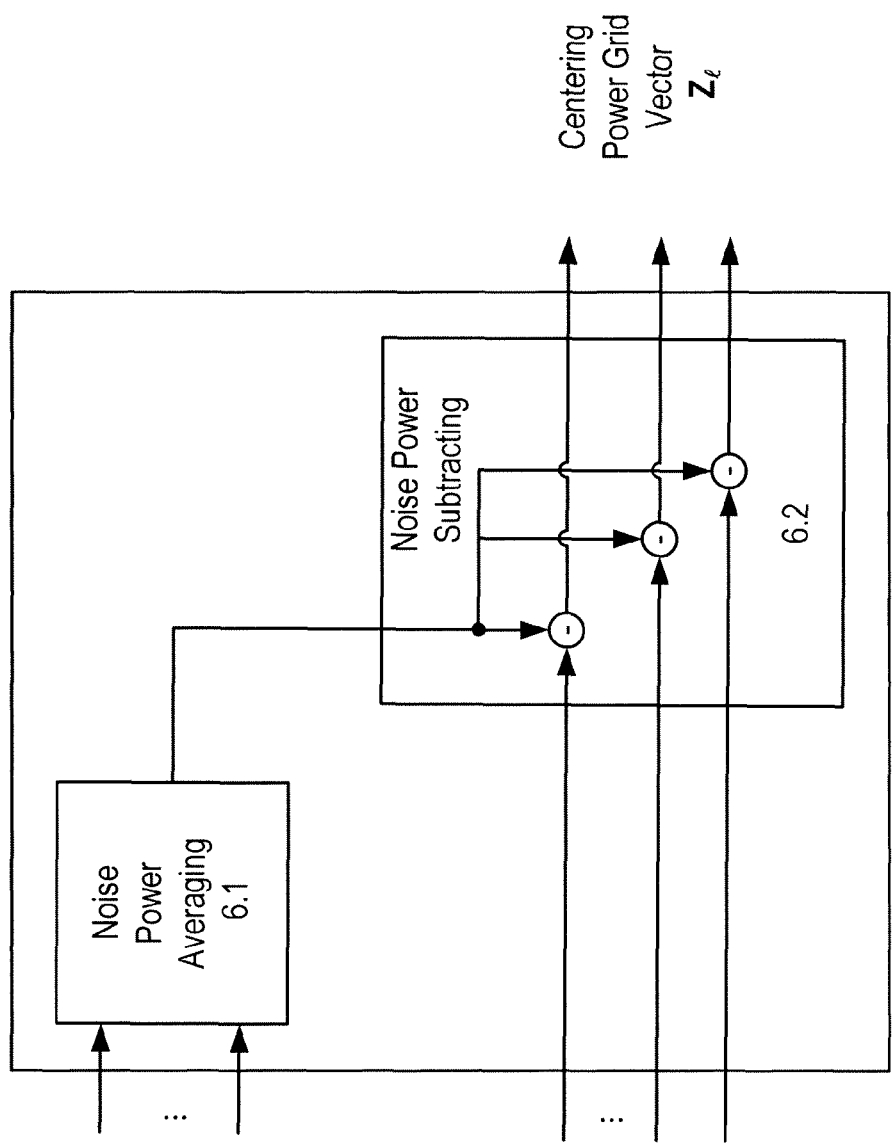
FIG. 6 illustrates a flow chart of power grid centering.

A flow chart of centering is shown in FIG. 6. Centering is averaging a part of bins of accumulated power grid which do not comprise a signal, in step 6.1, and subtracting the obtained average value of noise power from others (or all) elements in step 6.2.

In the beginning, a statistical model of observations of the accumulated powers vector differing in signal replica delays and corresponding to one peak signal frequency, is considered.

The model of centered vector Z of accumulated power grid, which model is corresponding to peak signal frequency $f_1^{max}$, can be written as:

$$Z = P(\tau)\theta(a, \Delta\phi) + \xi, \quad (6)$$

where:

$Z = (z_{l1}, z_{l2}, \ldots, z_{lN})^T$—vector of accumulated powers after a centering, corresponding to all delays and one peak signal frequency, N—quantity of powers corresponding to one frequency, $\tau = (\tau_0, \tau^1 \ldots, \tau_K)^T$—vector of delays of direct and reflected signals, index $k=0$ relates to a direct signal, K+1—total number of paths, $a = (a_0, a_1, \ldots, a_K)^T$—vector of amplitudes of signals coming by direct and reflected paths, $\Delta\phi = (\Delta\phi_1, \Delta\phi_2 \ldots, \Delta\phi_K)^T$—vector of phase difference between signals coming by direct and reflected paths ($\Delta\phi_K = (\phi_K - \phi_0)$), $P(\tau) = (R_{00}, R_{01}, \ldots, R_{0K}, R_{11}, R_{12}, \ldots, R_{1K}, R_{KK})$—a matrix with dimension $(N \times (K+1)*(K+2)/2)$, depending on delay $\tau_0$ of a signal coming by a direct path and delays $\tau_1, \tau_2, \ldots, \tau_K$ of signals coming by reflected paths.

$R_{km}$—vector of products of ACF signals coming by k-th and m-th paths on elements of accumulated power grid, defined as:
$R_{km} = (r(\tau_1^{mix} - \tau_k)r(\tau_1^{mix} - \tau_m), r(\tau_2^{mix} - \tau_k)r(\tau_2^{mix} - \tau_m), \ldots, r(\tau_N^{mix} - \tau_k)r(\tau_N^{mix} - \tau_m)^T$ $\tau_k, \tau_m$—propagation delays of k-th and m-th paths.

$r(\tau)$—ACF, $\tau_n^{mix}$—signal delay in n-th code mixer and n-th element of accumulated power grid ($n=1, \ldots N$), $\theta(a, \Delta\phi)$—vector depending on amplitudes a and phase difference $\Delta\phi$ of signals, coming by direct and reflected paths, defined as:

$\theta(a, \Delta\phi) = (a_0^2, 2a_0a_1\cos(\Delta\phi_1), \ldots, 2a_0a_K\cos(\Delta\phi_K), a_1^2, 2a_1a_2\cos(\Delta\phi_2-\Delta\phi_1), \ldots, 2a_1a_K\cos(\Delta\phi_K-\Delta\phi_1), \ldots, a_K^2)^T$ $\xi = (\xi_1 \ldots, \xi_N)^T$—random vector of noise fluctuations of a centered accumulated power grid with mathematical expectation equal to zero and covariance matrix $Q = \langle \xi\xi^T \rangle$.

As incoherent accumulation time usually is more or equal 1 second, the quantity of incoherent accumulations of power grid $N_{inc}$ is equal 50 and more. In these conditions, a noise distribution approaches normal distribution with zero mathematical expectation and is entirely defined by known covariance matrix Q.

In the conditions of a real city canyon, the quantity of reflected paths can be large. However, the greatest effect on measurement errors is exerted as a rule by one strongest reflected path. Thus, in case of two paths (direct and one reflected, K=1) number of unknown parameters is equal to 5. They are:

squared amplitudes of coming by direct and reflected path signals $a_0^2$ and $a_1^2$, phase difference cosine of direct and reflected path signals $\cos(\Delta\phi_1)$, delays of direct and reflected path signals $\tau = (\tau_0, \tau_1)^1$.

A system of likelihood equations comprises 5 unknown nonlinear parameters. Solving such system is a complex computation problem.

In case of two paths (direct and reflected), matrix P dimension is N×3, vector θ dimension is 3×1, where N —number of accumulated power grid elements for one frequency.

Matrix P and vector θ for two signal paths can be written as:

$$P(\tau) = \{P_0(\tau_0), P_1(\tau_1), P_2(\tau_0, \tau_1)\} \quad (7)$$

$$\theta = (a_0^2, a_1^2, 2a_0a_1\cos(\Delta\phi))^T, \quad (8)$$

where:

$P_0(\tau_0), P_1(\tau_1), P_2(\tau_0, \tau_1)$—vectors with dimension (N×1), depending on delays of direct and reflected paths, with elements:

$P_{0n}(\tau_0) = r^2(\tau_n^{mix} - \tau_0)$,
$P_{1n}(\tau_1) = r^2(\tau_n^{mix} - \tau_1)$,
$P_{2n}(\tau_0, \tau_1) = r(\tau_n^{mix} - \tau_0) r(\tau_n^{mix} - \tau_1)$,
$n=1, \ldots, N$,
$r(\tau)$—ACF, $a_0, a_1$—amplitudes of signals coming by direct and reflected paths, $\Delta\phi = (\phi_1 - \phi_0)$—phase difference of signals coming by direct and reflected paths.

If amplitudes and phase differences of signals are changed during accumulation time of accumulated power grid, it is necessary to replace a linear parameters vector (8) with a vector θ averaged in the same interval of accumulation. Changes of matrix P in the interval of accumulation of grid of accumulated powers may be ignored.

Pseudorandom navigation signals are changed in radio frequency and digital transformations steps 2.2, 2.4. These changes have a determined nature and are completely defined by known transfer functions of used filters. These signals are calculated and used for precalculating autocorrelation functions (ACF) $r(\tau)$ by way of multiplication by signal and accumulation replica. ACF $r(\tau)$ depends on type of signal replica, receiver bandwidth and amplitude-phase characteristics of analogue and digital filters used in a receiver.

ACF is precalculated and tabulated for simplification of calculations. In the sequel, ACF $r(\tau)$ is considered as known function depending on difference between delays of received signal and replica. The form of function $r(\tau)$ also depends on the number of GPS pseudo-random sequence (PRS) and number of GLONASS frequency channel.

As time of incoherent accumulation is big enough in comparison with time of the coherent accumulation (for example 1s and 20 ms), noise distribution is normalized. Therefore, further, Gaussian noise model is used at synthesis of the method.

For Gaussian noise distribution in the statistical model of observations described by equation (6), an asymptotically optimum method of conjoint measuring parameters of direct and reflected path signals is the maximum likelihood method (MLM). A likelihood function (LF) for model (6) relating to vector of centered accumulated powers Z can be written as:

$$y(\tau_0, \tau_1, \theta) = \ln(p(\theta, \tau|Z) = \text{const} - 0.5*\log(det(2\pi Q)) - 0.5* (Z-P\theta)^T Q^{-1}(Z-P\theta) \to \max \quad (9)$$

where:

$p(Z)$—density function of probability distribution of centered vector of accumulated powers Z, which is defined as:

$$p(Z)=\{det(2\pi Q)\}^{-1/2}\exp\{-0.5*(Z-P(\tau)\theta)Q^{-1}(Z-P(\tau)\theta)\}. \quad (9)$$

This LF is nonlinear function depending on 5 nonlinear parameters. It is necessary to find LF maximum for all parameters of equation (9). Solution of system of 5 nonlinear likelihood equations is a complex computation problem.

To find the maximum of LF (9) for parameters of delays $\tau_0$, $\tau_1$ at first used are estimations of maximum likelihood $\theta_{ml}$ related to linear part of parameters $\theta$, which can be obtained in explicit form:

$$\theta_{ml}=[P(\tau)^TQ^{-1}P(\tau)]^{-1}P(\tau)^TQ^{-1}Z \quad (10)$$

After that, obtained estimations $\theta_{ml}$ are substituted in (9) for determining LF maximum $y(\tau_0, \tau_1)$ relatively parameters $\tau_0, \tau_1$:

$$y(\tau_0,\tau_1)=-0.5*(Z^TQ^{-1}Z-Z^TQ^{-1}P(\tau)P(\tau)^TQ^{-1}P(\tau))^{-1}P(\tau)^TQ^{-1}Z) \rightarrow \max \quad (11)$$

After involving additional designations:

$S=Q^{-1/2}P(\tau)$—signal vector after noise whitening, depending on signal delays of direct and return paths, $X=Q^{-1/2}Z$—centered vector of accumulated powers after noise whitening.

After substituting S and X in expression (11), LF is obtained as function of delays $\tau_0, \tau_1$ in new form:

$$y(\tau_0,\tau_1)=-0.5*X^T[E-S(S^TS)^{-1}S^T]X=-0.5*X^TX+0.5*X^TS(S^TS)^{-1}S^TX \rightarrow \max \quad (12)$$

The first summand of equation (12) does not depend on parameters $\tau_0, \tau_1$, so it is necessary to calculate the second summand maximum only. A method of correction measurement for parameters of delay $\Delta\tau_0, \Delta\tau_1$ is defined, thus, by calculation of the second summand in equation (12).

Figure 7:
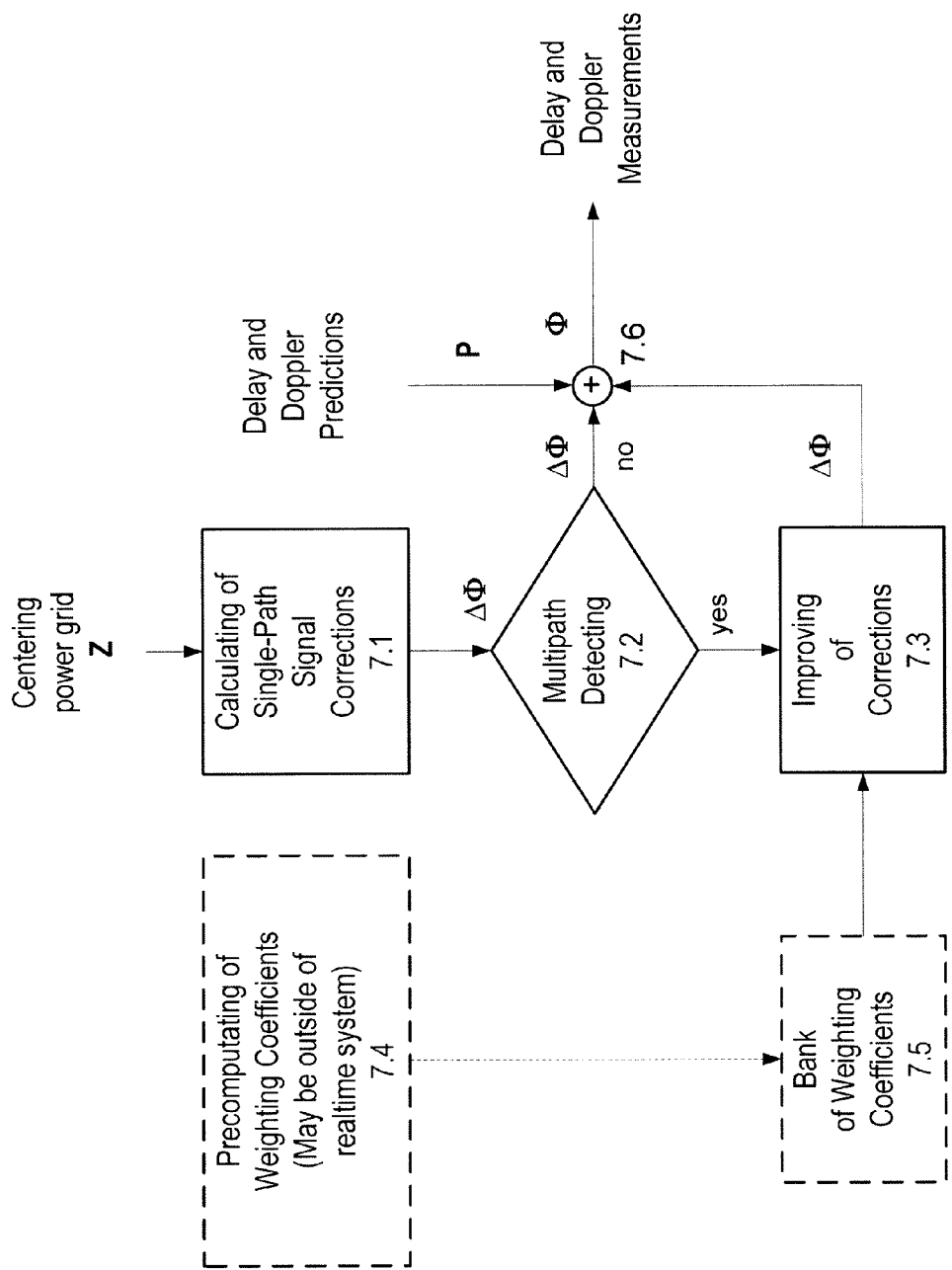
FIG. 7 illustrates a flow chart of calculating measurements with elimination of multipath influence.

Flow chart of calculation of measurements with elimination of multipath effect for open loop tracking is shown in FIG. 7. In step 7.1, two-dimensional centered accumulated power grid Z is used for calculating delay and Doppler frequency corrections $\Delta\Phi=(\Delta\tau, \Delta f)^T$ for a single-path signal using two-dimensional interpolation, least square method or other known method. Then, in step 7.2, detection of multipath is performed based on difference of a grid shape from a reference shape for a single-path signal. If differences do not exceed a threshold of multipath detection, in step 7.6, calculation of delay and Doppler frequency estimations with obtained corrections is performed: $\Phi=(\tau, f)^T=P+\Delta\Phi$.

If multipath is detected, improvement of corrections $\Delta\Phi$ in step 7.3 (described below in details) and calculation of delay and Doppler frequency measurements in step 7.6 are performed with these corrections. The combination of possible offset positions of delays $\Delta\tau_i=\tau-\tau_0$ of signals coming by a direct path is defined from the error analysis of used method for determination of single-path signal corrections with presence of reflected path. Delay $\Delta\tau_j$ of reflected path signal is selected from the band, where a reflected signal has significant effect on measurement accuracy of direct path delay.

During improvement of corrections in step 7.1, weights which can be obtained, for example, from bank of weights in step 7.5, are used. For this purpose, the band of direct and reflected signal delays is divided into intervals, for each of which precalculation of weights required for calculating likelihood function is performed in step 7.4 (probably out of real-time system), and writing these precalculated coefficients in a bank of weights is performed.

Figure 8:
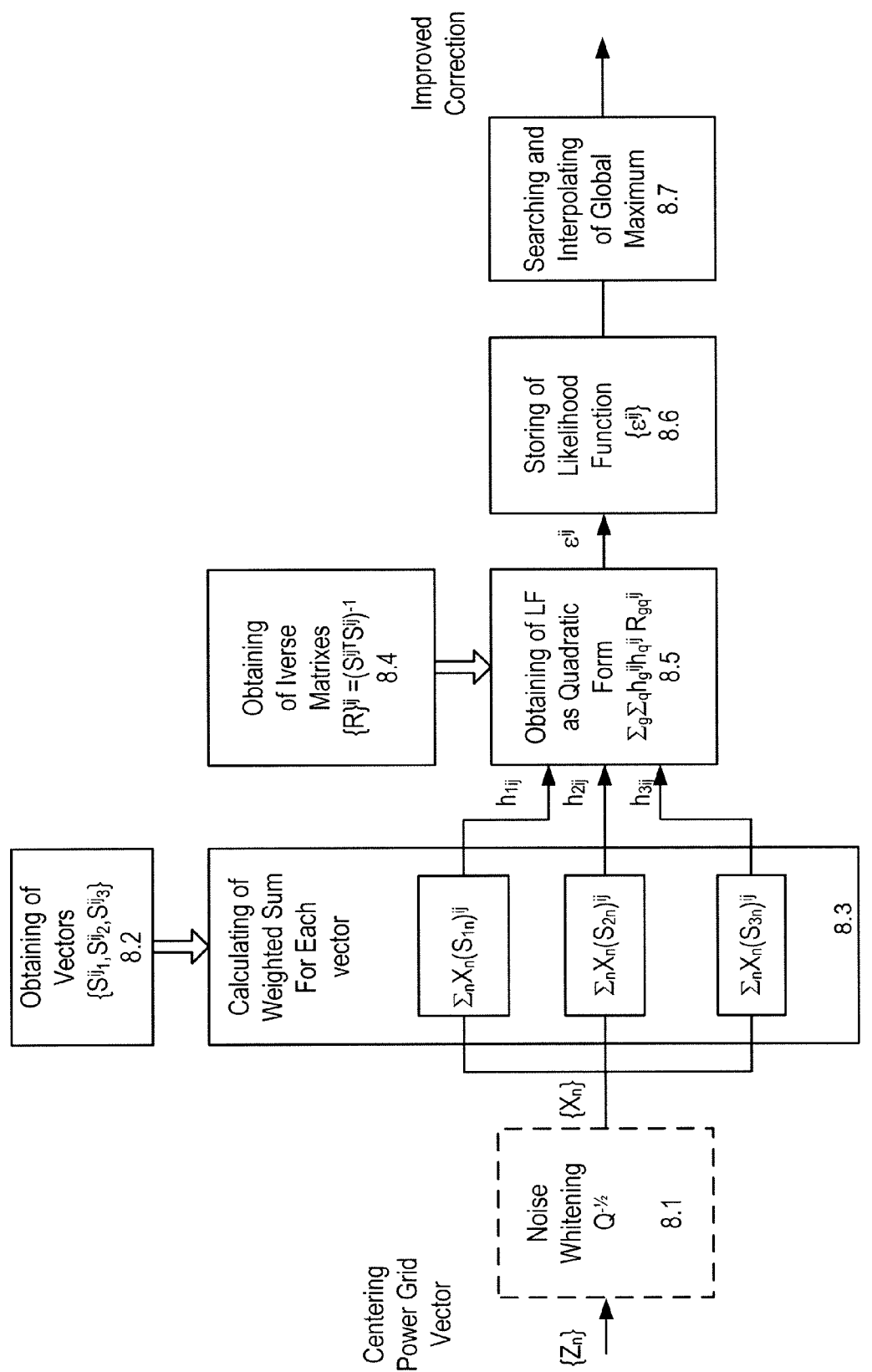
FIG. 8 illustrates a flow chart of an implementation of calculating corrections according to the claimed method for elimination of multipath influence using signal vectors $S^{ij}=Q^{-1/2}P^{ij}$ and inverse matrices $(S^{ijT}S^{ij})^{-1}$.

A flow chart of measuring set according to equation (12) is shown in FIG. 8.

In step 8.1, noise whitening (multiplication of vector of centered accumulated powers Z by matrix $Q^{-1/2}$) is performed:

$$\{X_n\} = \sum_{k=1}^{N} Q_{nk}^{-1/2} Z_k \quad (13)$$

Figure 12:
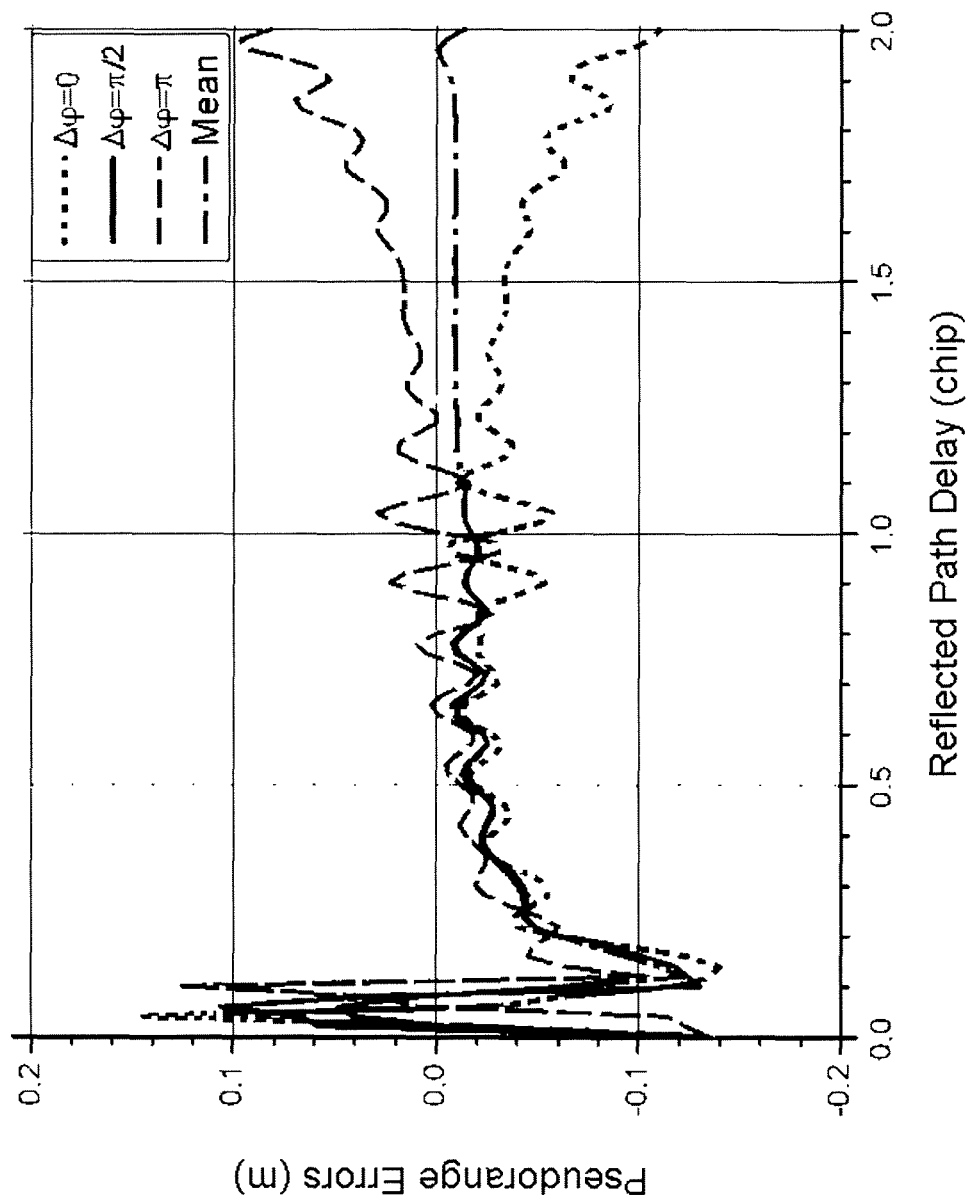
FIG. 12 illustrates estimation errors of direct path signal delay, calculated according to the claimed method.

Matrix $Q^{-1/2}$ can be calculated, for example, by way of decomposition into two triangular matrices according to Cholesky scheme and subsequent triangular matrix inversion [Trefethen L. N., Bau D. Numerical Linear Algebra, SIAM, 1997, p. 172]. It is necessary to notice that noise whitening operation only reduces measurement noises and does not take an effect on offset errors caused by multipath. Modeling has shown that without whitening (which corresponds to Q=E, where E is a unitary matrix), direct signal delay measurements with presence of multipath remain unshifted (FIG. 12). Therefore, noise whitening operation is not mandatory for the proposed method.

Further, in step 8.2, three sets of weights corresponding to vectors $S_1^{ij}, S_2^{ij}, S_3^{ij}$ are obtained for each value of direct and reflected path delays $\tau^i_0, \tau^j_1$, accordingly, and, in step 8.3, calculation of three weighed sums of vector X components with these weights is performed:

$$h_q^{ij} = \sum_{n=1}^{N} X_n S_{qn}^{ij}, \quad (14)$$

where:

q=1, 2, 3—number of column-vector of $S^{ij}$ matrix, corresponding to a pair of delays of direct and reflected paths, i, j—numbers of delays of direct and reflected paths on a grid of LF construction.

After step 8.3, obtained values of weighed sums $h_1^{ij}, h_2^{ij}$ and $h_3^{ij}$ are multiplied pairwise in step 8.5, and then they are summed with the weights of an inverse matrix $R^{ij}=(S^{ijT}S^{ij})^{-1}$ with dimension 3×3 obtained in step 8.4, for calculating LF:

$$\varepsilon^{ij} = \sum_{g=1}^{3} \sum_{q=1}^{3} h_g^{ij} h_q^{ij} R_{gq}^{ij} \quad (15)$$

This operation represents calculation of a quadratic form. Result of calculations is LF $\{\varepsilon^{ij}\}$, saved in memory in step 8.6.

This procedure is repeated for each pair of delays of direct and reflected paths (each pair of delays $\tau^i_0, \tau^j_1$ is associated with corresponding values of weight vectors $S^{ij}$ and inverse matrices $R^{ij}$). After that, in step 8.7, determining and interpolating global maximum for all calculated LF values $\{\varepsilon^{ij}\}$ for delay parameters of direct and reflected paths $\tau^i_0, \tau^j_1$ are performed.

Figure 13:
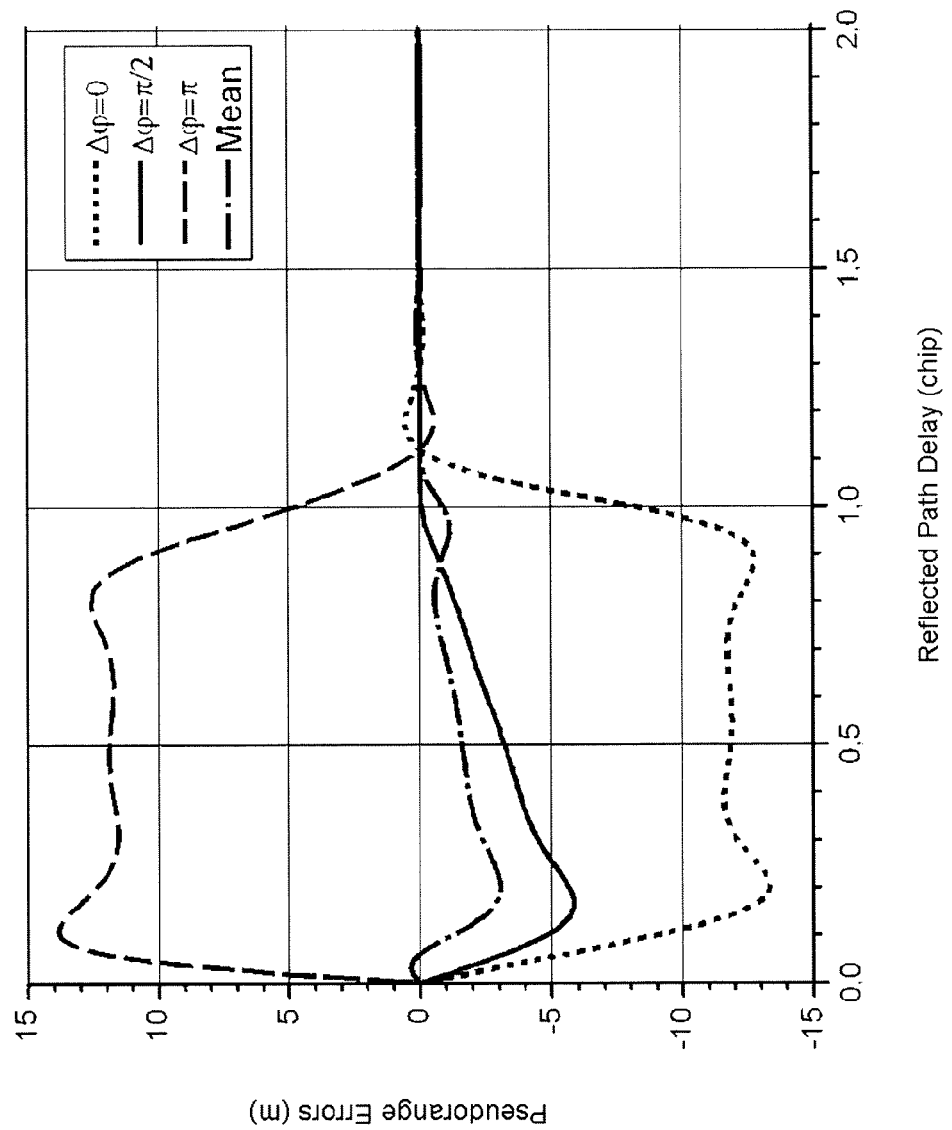
FIG. 13 illustrates estimation errors of direct path signal delay, calculated for a narrow correlator.

A delay search area for direct and reflected paths was determined from analysis of pseudorange errors calculated for a narrow correlator (FIG. 13). In the beginning, delay $\tau_{max}$ corresponding to position of interpolated accumulated powers maximum, was determined. At that, delays $\tau^i_0$ for a direct path were selected in a band with relation to $\tau_{max}$:

$$\tau_{max}-15_M/C<\tau^i_0<\tau_{max}+15_M/C,$$

where C—velocity of light,
and reflected path delays $\tau^j_1$ were selected in a band, in which reflected path takes an effect on accuracy of direct path delay estimation, namely:

$$\tau_{max}+15_M/C<\tau^j_1<\tau_{max}+300m/C.$$

Modeling has shown that for search of direct path delay the step of 1-2 m/C, and for search of reflected path delay the step of 10-20 m/C is required.

Figure 10:
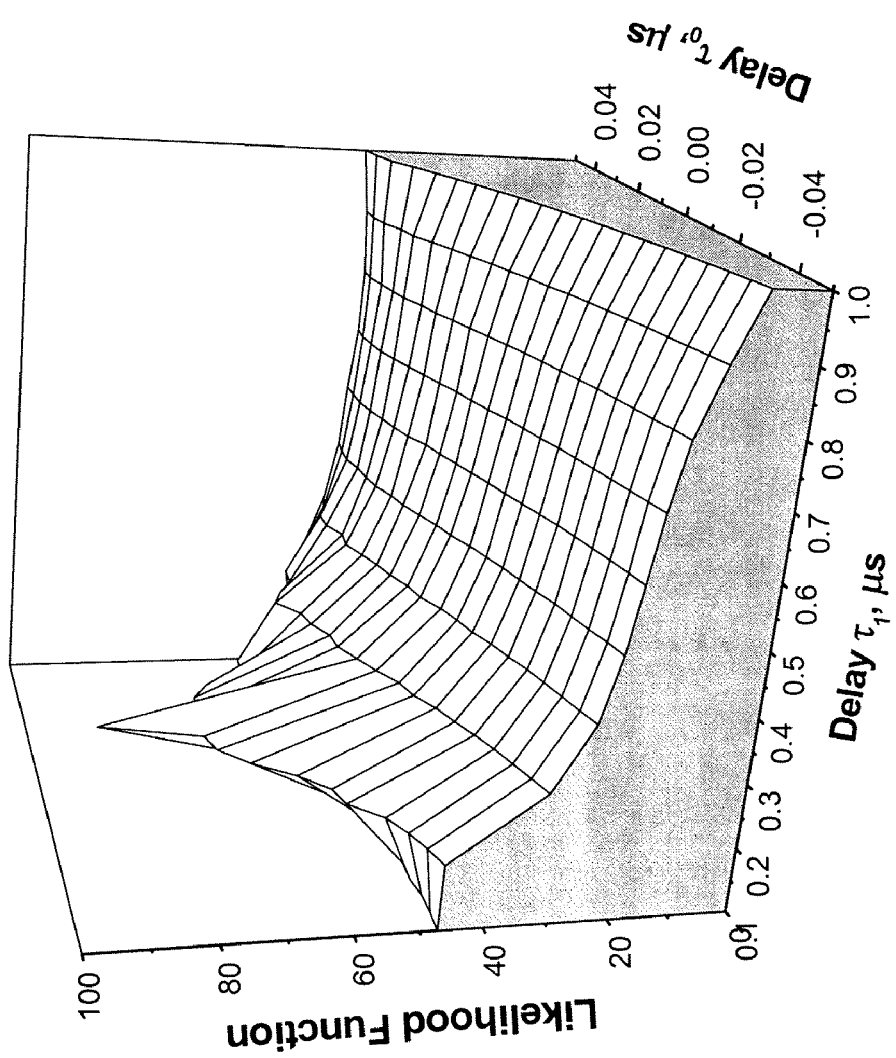
FIG. 10 illustrates an example of a likelihood function $y(\tau_0, \tau_1)$ for a multipath signal.
Figure 11:
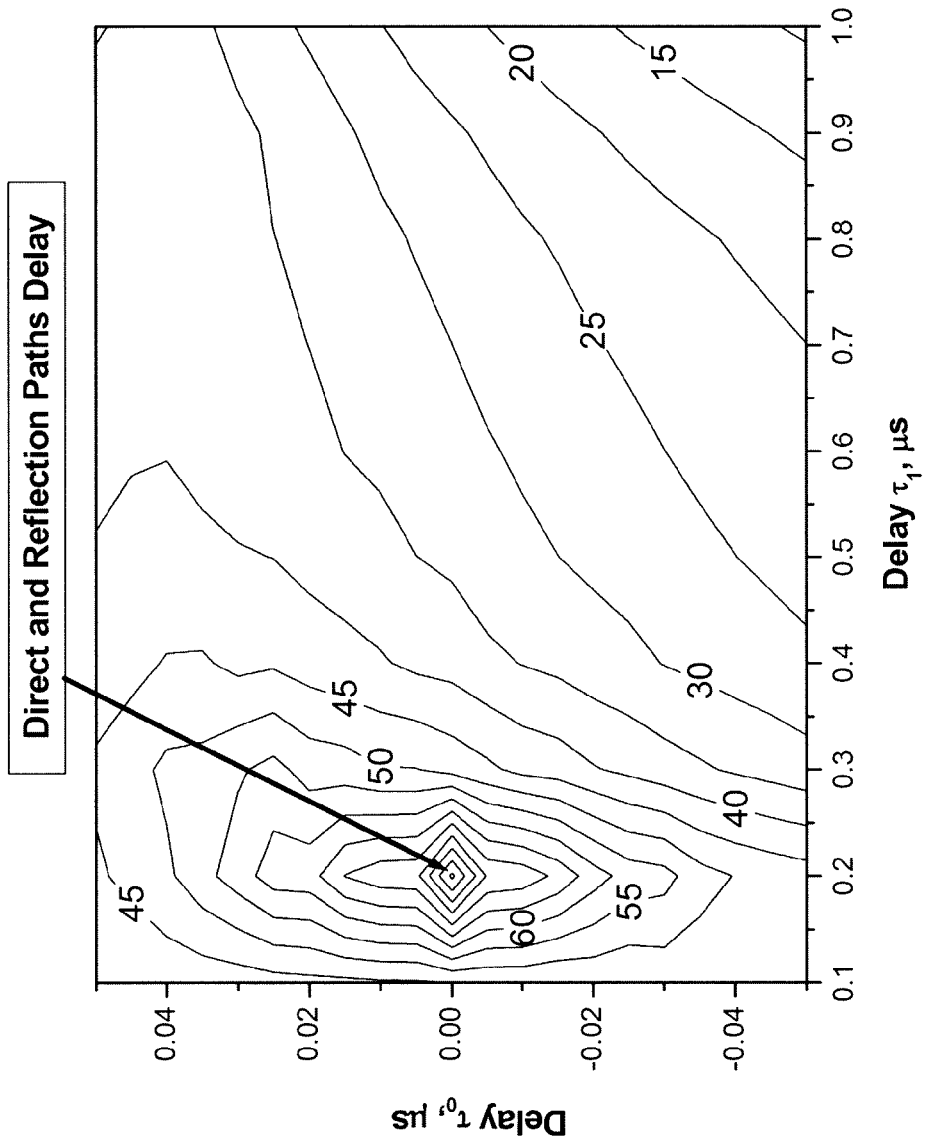
FIG. 11 illustrates a projection of a likelihood function $y(\tau_0, \tau_1)$ and delay estimation for direct and reflected paths.

Example of LF for two (direct and 1 reflection) path signal is shown in FIGS. 10, 11.

Two-dimensional parabolic LF maximum approximation was used for obtaining delay $\hat{\tau}_0$, $\hat{\tau}_1$ estimations of signals coming by direct and reflected paths.

Figure 14:
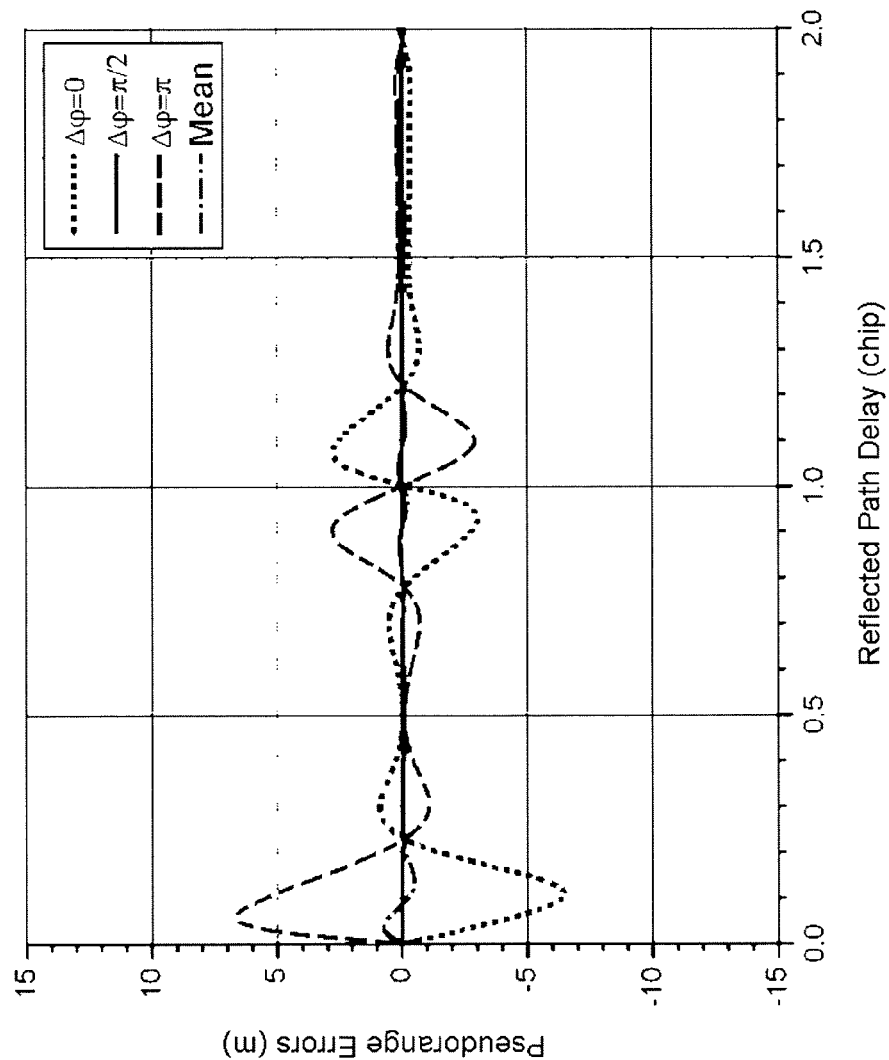
FIG. 14 illustrates estimation errors of direct path signal delay, calculated for a strobe correlator.

Comparative modeling, which results are submitted on FIGS. 12-14, has been performed for comparison of accuracy of the proposed method with a narrow correlator and a strobe correlator at the same conditions (receiver signals frequency bandwidth $\Delta F=6$ MHz, attenuation of reflected path signal is equal 6 dB).

Bias errors of delay measurement of the signal coming by direct path for the proposed method represented in FIG. 12 are very small (less than 0.12 m/C) in comparison with a narrow correlator (FIG. 13, errors offset up to 15 m/C) and a strobe correlator (FIG. 14, offset up to 7 m/C).

Above (FIG. 8), the method of improvement of corrections using vectors $S=Q^{-1/2}P$, $X=Q^{-1/2}Z$ and inverse matrices $(S^{ijT}S^{ij})^{-1}$ has been described. Disadvantage of this scheme is necessity of saving, along with vectors S, return matrices $R=(S^TS)^{-1}$ and calculating quadratic forms in step 8.5. An alternative method of improvement of corrections will be further considered, which uses orthonormalized vectors of signals depending on signal delays of direct and reflected paths.

The matrix $(S^TS)$ is a symmetrical nonnegatively defined matrix with dimension 3×3. This matrix can be submitted in the following form:

$$(S^TS)=U\Lambda U^T, \quad (16)$$

where:
U—a square matrix of orthonormal eigenvectors with dimension 3×3,
$\Lambda=\text{diag}(\lambda_1, \lambda_2, \lambda_3)$—a diagonal matrix of non-negative eigenvalues.

Accordingly, inverse matrix $(S^TS)^{-1}$ can be submitted in a form:

$$(S^TS)^{-1}=U\Lambda^{-1}U^T=(U\Lambda^{-1/2})(U\Lambda^{-1/2})^T. \quad (17)$$

Thus, matrix $S(S^TS)^{-1}S^T$ can be submitted in a form:

$$S(S^TS)^{-1}S^T=(SU\Lambda^{-1/2})(SU\Lambda^{-1/2})^T=VV^T, \quad (18)$$

where $V=(V_1,V_2,V_3)=SU\Lambda^{-1/2}$—a matrix with dimension N×3, which columns $V_1, V_2, V_3$ are 3 orthonormalized eigenvectors of matrix $S(S^TS)^{-1}S^T$. This matrix depends only on delays $(\tau_0, \tau_1)$ of direct and reflected paths. After substitution of equation (18) in (12), calculation of LF can be written as:

$$y(\tau_0,\tau_1)=\text{const}+0.5*X^TV(\tau_0,\tau_1)V(\tau_0,\tau_1)^TX\rightarrow\max. \quad (19)$$

Using orthonormal vectors simplifies digital implementation of the proposed method. In this case, operation of inverting matrices is excluded, quadratic form is led to diagonal kind, and integer calculations can be applied.

Another method of similar simplification of calculations is obtained at matrix $(S^TS)$ decomposition into two triangular matrices according to the Cholesky scheme (See reference above—Trefethen L. N., Bau D. Numerical Linear Algebra, SIAM, 1997, p. 172):

$$(S^TS)=\Delta^T\Delta, \quad (20)$$

where:
$\Delta$—lower triangular matrix,
$\Delta^T$—upper triangular matrix.
In this case inverse matrix is equal:

$$(S^TS)^{-1}=(\Delta^T\Delta)^{-1}=\Delta^{-1}(\Delta^{-1})^T. \quad (21)$$

Operation of triangular matrices conversation becomes essentially simpler. In this case, orthonormalized vectors V are precalculated according to the formula:

$$V=(V_1,V_2,V_3)=S\Delta^{-1}. \quad (22)$$

Further processing is similar to processing with eigenvectors (19).

Orthonormalized vectors V also can be obtained from vectors S using Gram-Shmidt procedure of orthonormalization [Trefethen L. N., Bau D. Numerical Linear Algebra, SIAM, 1997, p. 56]

Figure 9:
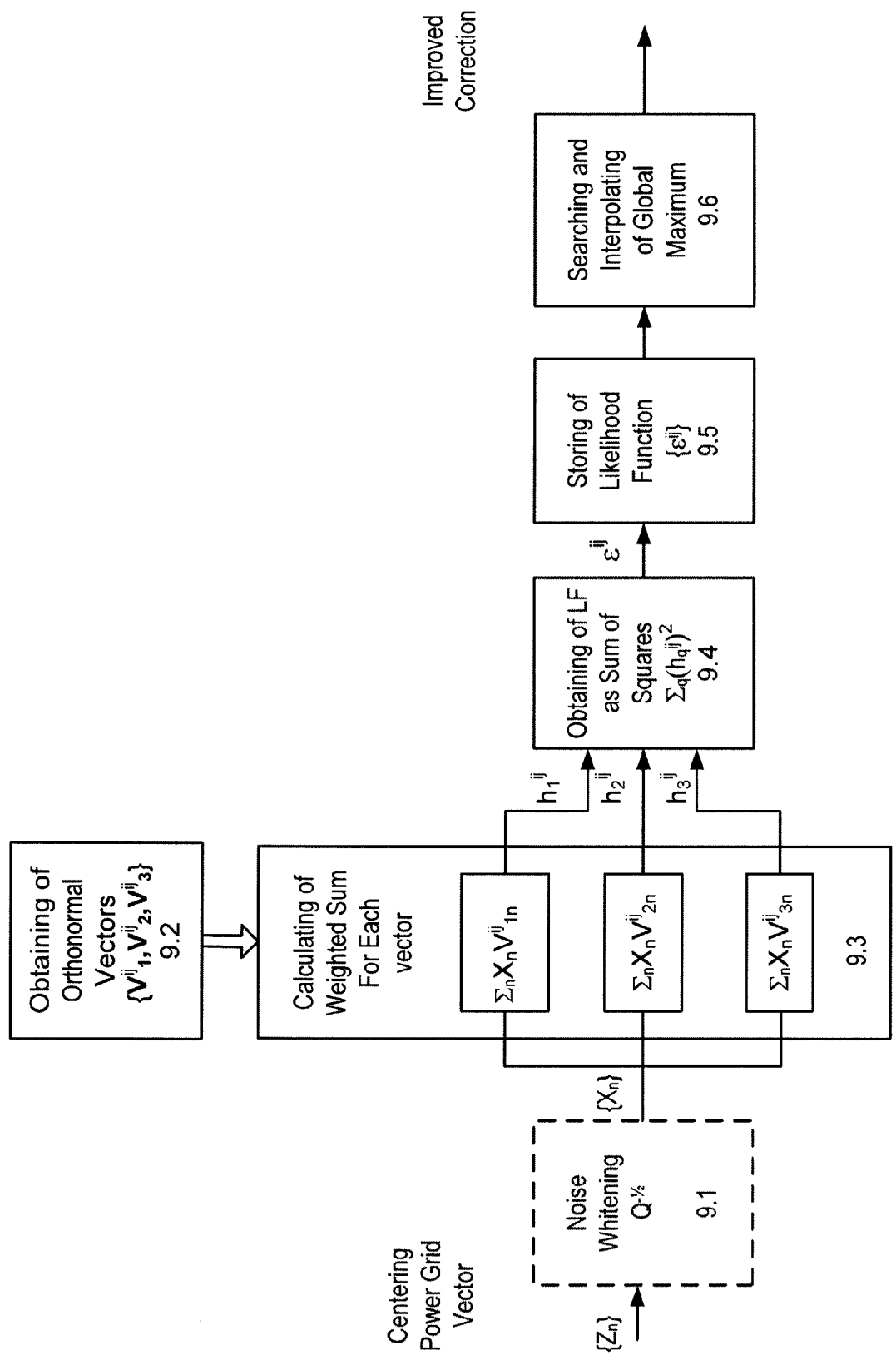
FIG. 9 illustrates a flow chart of an implementation of calculating corrections according to the claimed method for elimination of multipath influence using orthonormalized signal vectors $V^{ij}$.

FIG. 9 illustrates elimination of multipath effect using orthonormalized vectors of signals. This implementation, as well as described above, can include (but unessential) also the step of noise whitening (9.1), and includes steps of storing in memory values of LF (step 9.5) and finding and interpolating global maximum (step 9.6).

Its differences from described above are that, in step 9.3 of calculating weighed sums for each vector, orthonormalized vectors $V^{ij}=(V^{ij}_1, V^{ij}_2, V^{ij}_3)$ are used:

$$h^{ij}_g = \sum_{n=1}^{N} X_n V^{ij}_{gn}, \quad (23)$$

where g=1, 2, 3—eigenvector number.
Further, in step 9.4, sum of squares of weighed sums $h^{ij}_g$ is calculated:

$$\varepsilon^{ij} = \sum_{g=1}^{3} (h^{ij}_g)^2, \quad (24)$$

which is LF value corresponding to parameters of delays $\tau^i_0, \tau^j_1$ of signals coming by direct and reflected paths.

The method of reduction of measurement errors of delay of a signal coming by a direct path in presence of a reflected path having the same frequency has been considered above.

Figure 1B:
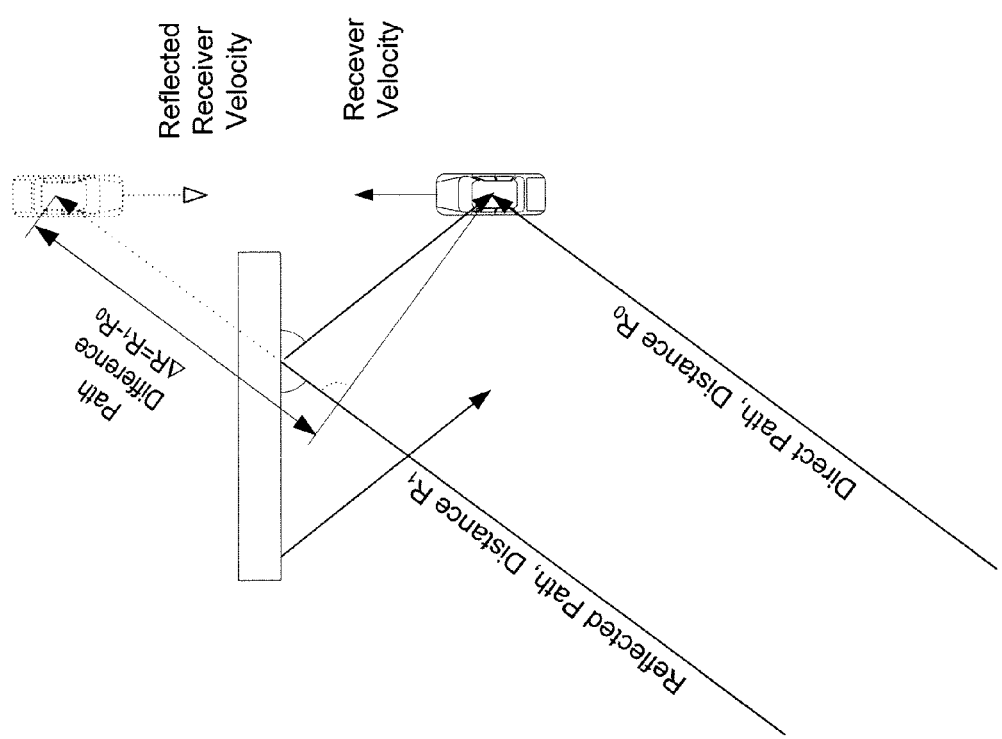

A multipath signal, observed by moving consumer, has offset in frequency domain caused by Doppler effect. In this case, a direct path signal has not shifted Doppler offset, and a reflected path signal has Doppler offset depending on position of reflecting surface (see FIG. 1*b*). The proposed method can be used, in this case, for Doppler frequency measurement error reduction. For this purpose, a vector of grid elements of accumulated powers corresponding to maximum power delay $\tau_n^{max}$ and various frequencies is used. Multipath detection with frequency difference of a signal coming by a reflected path is performed by way of comparison of distribution of signal accumulated powers by frequency.

In this case, matrix P, unlike expression (7), can be written in the following form:

$$P=P(f)=(P_0,P_1,P_2), \quad (25)$$

where:

$f=(f_0, f_1)^T$—a vector of unknown Doppler offsets for direct $f_0$ and reflected $f_1$ paths, $P_0$, $P_1$, $P_2$—vectors of a signal with dimension L×1 depending on Doppler frequencies of direct and reflected signals with elements:

$P_{0l}=\sin c^2[\pi(f_l^{mix}-f_0)T_{coh}]$,
$P_{1l}=\sin c[\pi(f_l^{mix}-f_0)T_{coh}] \sin c[\pi(f_l^{mix}-f_1)T_{coh}]$,
$P_{2l}=\sin c^2[\pi(f_l^{mix}-f_1)T_{coh}]$, $l=1, \ldots, L$—accumulated power grid frequency number,
$f_l^{mix}$—frequency of l-th carrier mixer (and of l-th element of power grid),
$T_{coh}$-coherent accumulation time.

Function of sinc (x) is defined as: $\sin c(x)=\sin(x)/[N_{coh}\cdot\sin(x/N_{coh})]$.

Bins of centered power grid are used as vector $Z=(Z_{1n}, Z_{2n}, \ldots, Z_{Ln})^T$, which grid corresponds to all peak signal delay frequencies $\sigma_n^{max}$. Clarified corrections $\Delta f_0$, $\Delta f_1$ are obtained by maximization of LF, which LF is set by equation (26) corresponding to usage of signal vectors:

$$y(f_0,f_1)=-0.5*X^T[E-S(S^TS)^{-1}S^T]X=-0.5*X^TX+0.5*X^TS(S^TS)^{-1}S^TX\to\max, \quad (26)$$

where:
$S=Q^{-1/2}P(f_0, f_1)$—matrix of signal vectors depending on Doppler offsets $f_0$, $f_1$ for direct and reflected paths, after noise whitening.
$X=Q^{1/2}Z$—centered accumulated powers vector corresponding to all frequencies and one delay of peak signal, after noise whitening.

Equation (26) also can be simplified by usage of orthonormalized vectors of a signal:

$$y(f_0,f_1)=\text{const}+0.5*X^TV(f_0,f_1)V(f_0,f_1)^TX\to\max, \quad (27)$$

where:
$V(f_0, f_1)$—orthonormalized signal vector matrix depending on Doppler frequencies.

Implementation of the method is similar to described above concerning delays and represented in FIGS. 8, 9.

Figure 15:
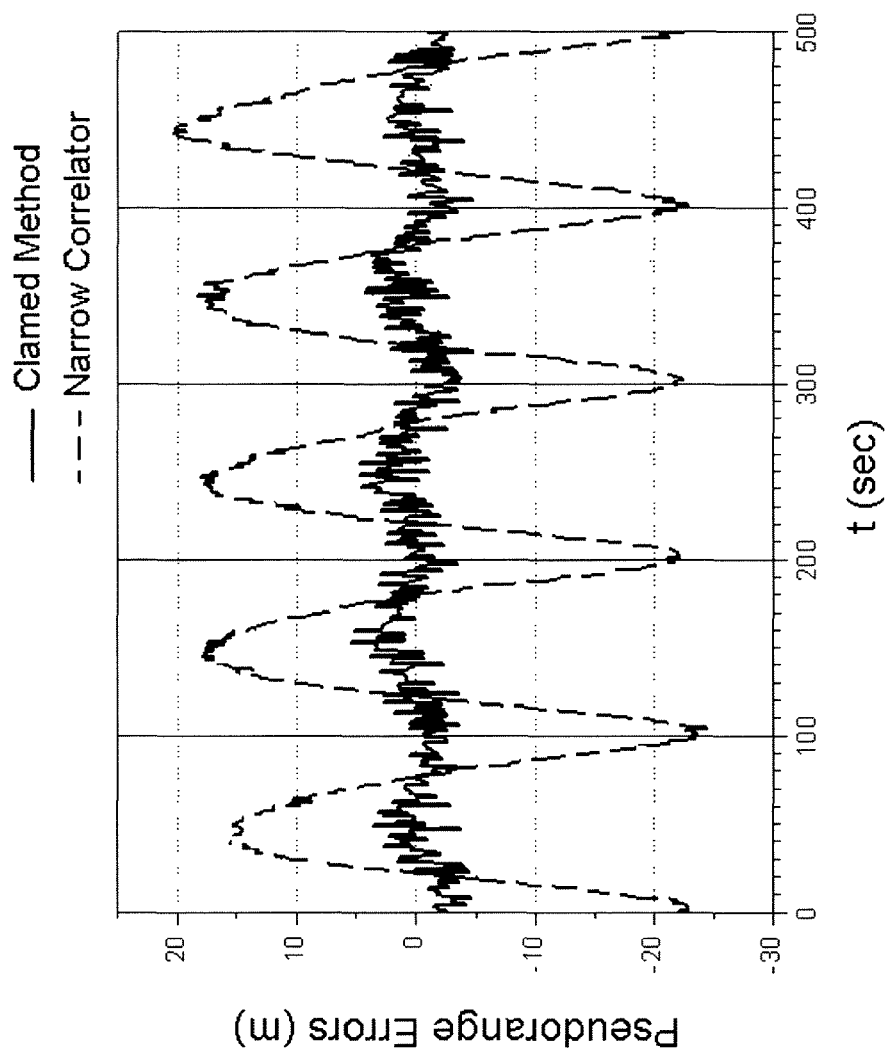
FIG. 15 illustrates comparison of pseudo-range estimation errors according to the claimed method and a narrow correlator.
Figure 16:
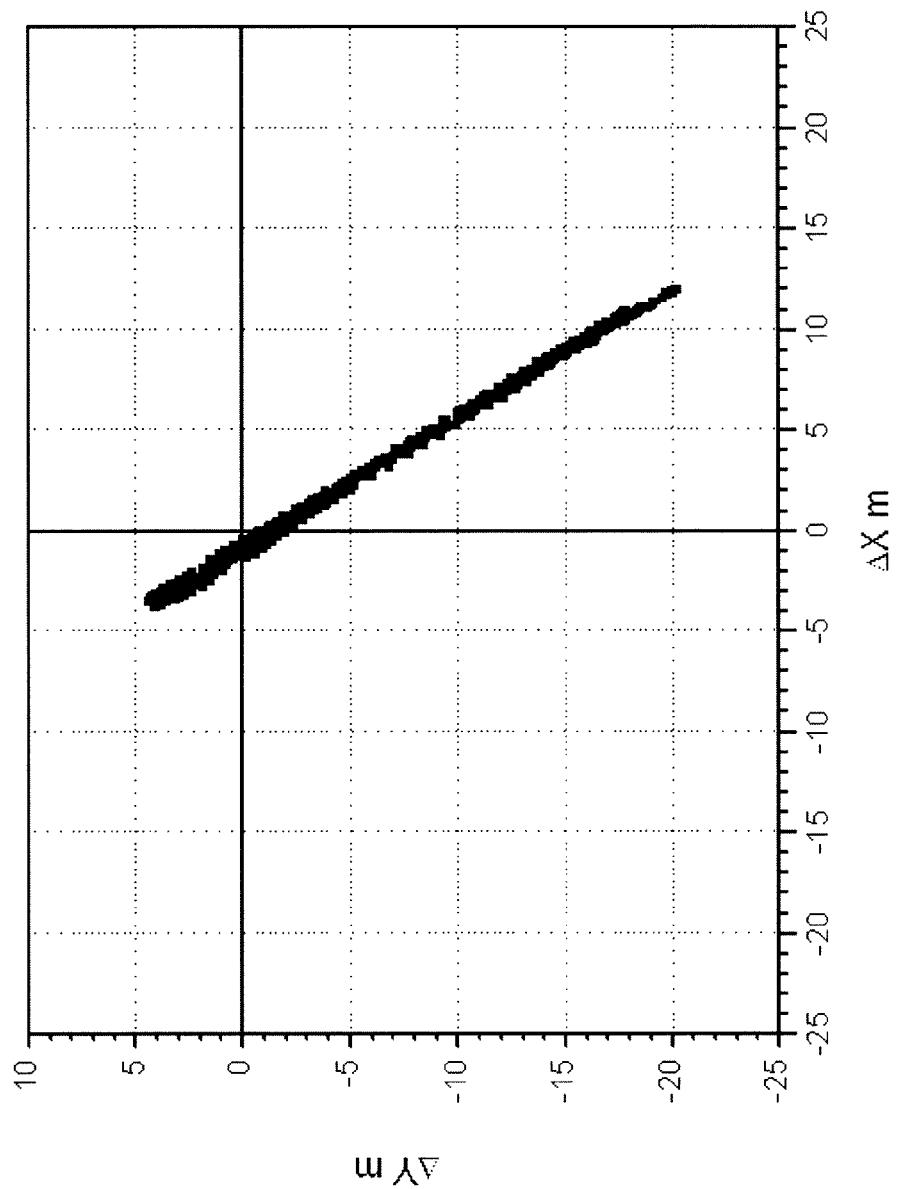
FIG. 16 illustrates coordinate measurement errors using a narrow correlator.
Figure 17:
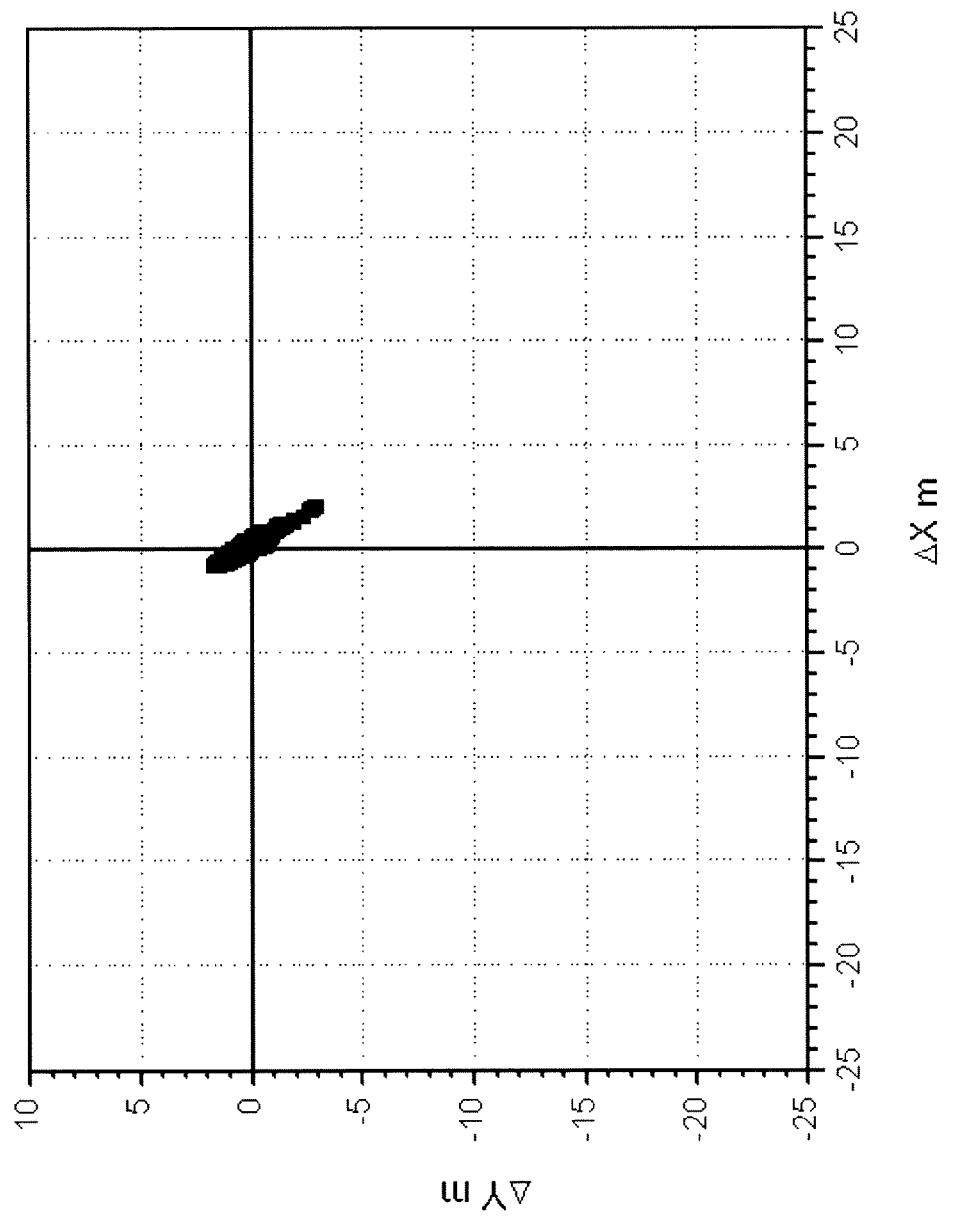
FIG. 17 illustrates coordinate measurement errors using the claimed method.

Results of comparative tests are presented for confirmation of efficiency of the claimed method (FIGS. 15, 16, 17).

In FIG. 15 presented are pseudorange errors obtained as a result of processing a multipath signal with usage of the claimed method (curve 1) and without its use for estimation of delays with use only a narrow correlator—curve 2. Power grid bin size is equal to 0.125 μs, a multipath signal is obtained using a multichannel simulator with reflected path parameters: attenuation −6 dB and delay 0.5 μs, difference of Doppler offsets of direct and reflected paths is equal 0.012 Hz (which corresponds to static receiver), a receiver bandwidth BW=6 MHz.

Pseudorange errors are decreased 4-5 times due to the usage of the claimed method.

FIG. 16 illustrates the fuzzball obtained using a narrow correlator, FIG. 17 illustrates the fuzzball obtained using the claimed method. As it seen from figures, receiver coordinates determination errors in a horizontal plane $\Delta X$, $\Delta Y$ are reduced 4-5 times due to usage of the proposed method.

Thus, the proposed delays and Doppler frequency measurement method allows to suppress multipath errors for weak signals using power grid data.

Coherent accumulation of complex signals is performed bit-synchronously with coherent accumulation time matched with a data bit length equal 20 ms for GPS and GLONASS systems. It allows to dejam from unknown data bits in a transmitted signal navigation message and to lower an admissible signal/noise ratio below a data decoding threshold.

In case if data bits are known or can be decoded, a corresponding to these bits complex signal carrier phase inversion can be compensated. In this case, coherent accumulation time is selected based on reference frequency oscillator properties and usually equals tenths of second. Multipath errors suppression according to accumulated power grid data, in this case, also is possible for low signal/noise ratios.

The method allows to suppress multipath errors, arising at measurement of both delay (pseudorange) and Doppler frequency (pseudovelocity) after detection of multipath according to power grid data.

The proposed method also allows performing operations necessary for suppression of multipath errors, 1 time per second and can be implemented in a programmed processor.

What is claimed is:

1. A method of multipath error suppression in a satellite navigation receiver, comprising steps of navigation satellites signals searching, receiving and processing complex signals from each satellite, tracking found signals with a following-up open loop and determining coordinates, receiver velocity and exact time based on measurements of direct and reflected signal delay and Doppler frequency, the method comprising:

on the basis of navigation parameters including coordinates, receiver velocity and exact time, and also information on satellite movement obtained on the basis of measured time and received ephemerides, calculating delay and Doppler frequency predictions for orientation of a two-dimensional accumulated power grid according to delay and Doppler frequency, which grid formed on the basis of received and processed complex signals;

wherein, in the course of grid elements forming, a summation of complex signal is performed in a coherent accumulation interval synchronously with data bits of the given satellite, and the coherent accumulation time is matched with a bit length;

further on the basis of processing the accumulated power grid including its centering, calculating corrections for delay and Doppler frequency predictions, and calculating delay and Doppler frequency measurements as the sum of predictions and corresponding corrections, then extrapolating obtained measurements for the preset moment of time and calculating pseudorange and pseudovelocity measurements, and determining a receiver coordinates and velocity on the basis of the measurements obtained for all satellites;

wherein calculation of delay and Doppler frequency corrections comprises steps of:

calculating single-path signal corrections using the centered accumulated power grid;

determining, whether a multipath is presented; and in case of positive result of this determination, performing improvement of corrections using weights;

wherein, performing improvement of corrections using weights is carried out by forming a likelihood function on the basis of a centered accumulated powers vector, and correction is performed according to the found likelihood function global maximum.

2. The method of claim 1, characterized in that forming the likelihood function on the basis of the centered accumulated powers vector-comprises following substeps:

calculating weighed sums for each of a plurality of signal vectors using vectors of weights corresponding to predicted direct and reflected signal delays;

obtaining inverse matrices of the matrices formed on the basis of pairwise scalar products of vectors of weights; and calculating the likelihood function as a quadratic form with results of the first and second substeps.

3. The method of claim 1, characterized in that forming the likelihood function on the basis of the centered accumulated powers vector comprises following substeps:
    calculating weighed sums for each of a plurality of signal vectors using orthonormal vectors of signals depending on direct and reflected signal delays; and
    calculating the likelihood function by calculating a sum of obtained weighed sums squares.

4. The method of claim 1, characterized in that forming the likelihood function on the basis of the centered accumulated powers vector comprises following substeps:
    calculating weighed sums for each of a plurality of signal vectors using vectors of weights corresponding to predicted direct and reflected signal Doppler frequencies;
    obtaining inverse matrices of the matrices formed on the basis of pairwise scalar products of weights vectors; and
    calculating the likelihood function as a quadratic form with results of the first and second substeps.

5. The method of claim 1, characterized in that forming the likelihood function on the basis of the centered accumulated powers vector comprises following substeps:
    calculating weighed sums for each vector using orthonormalized vectors of signals depending on Doppler frequencies of direct and reflected signals; and
    calculating the likelihood function by calculating a sum of obtained weighed sums squares.

6. An apparatus for suppressing multipath error in a satellite navigation receiver, comprising:
    an analog front end coupled to an antenna;
    a digital circuit in communication with the analog front end; and
    a processor in communication with the digital circuit, wherein the apparatus is configured to search for navigation satellites signals, receive and process complex signals from each satellite, track found signals with a following-up open loop and determining coordinates, receiver velocity and exact time based on measurements of direct and reflected signal delay and Doppler frequency, calculate, on the basis of navigation parameters including coordinates, receiver velocity and exact time, and also information on satellite movement obtained on the basis of measured time and received ephemerides, delay and Doppler frequency predictions for orientation of a two-dimensional accumulated power grid according to delay and Doppler frequency, which grid formed on the basis of received and processed complex signals;
    wherein, in the course of grid elements forming, a summation of complex signal is performed in a coherent accumulation interval synchronously with data bits of the given satellite, and the coherent accumulation time is matched with a bit length; and
    wherein the apparatus is configured to calculate, on the basis of processing the accumulated power grid including its centering, corrections for delay and Doppler frequency predictions, and calculate delay and Doppler frequency measurements as the sum of predictions and corresponding corrections, then extrapolate obtained measurements for the preset moment of time and calculate pseudorange and pseudovelocity measurements, and determine a receiver coordinates and velocity on the basis of the measurements obtained for all satellites;
    wherein in calculating delay and Doppler frequency corrections, the apparatus is configured to calculate single-path signal corrections using the centered accumulated power grid, determine whether a multipath is presented, and perform improvement of corrections using weights in case of positive result of this determination;
    wherein, performing improvement of corrections using weights is carried out by forming a likelihood function on the basis of a centered accumulated powers vector, and correction is performed according to the found likelihood function global maximum.

7. The apparatus of claim 6, wherein in performing the improvement of corrections using weights to form the likelihood function on the basis of the centered accumulated powers vector, the apparatus is further configured to calculate weighed sums for each of a plurality of signal vector using vectors of weights corresponding to predicted direct and reflected signal delays, obtain inverse matrices of the matrices formed on the basis of pairwise scalar products of vectors of weights, and calculate the likelihood function as a quadratic form with the weighed sums and the inverse matrices.

8. The apparatus of claim 6, wherein in forming the likelihood function on the basis of the centered accumulated powers vector the apparatus is further configured to calculate weighed sums for each of a plurality of signal vectors using orthonormal vectors of signals depending on direct and reflected signal delays, and calculate the likelihood function by calculating a sum of obtained weighed sums squares.

9. The apparatus of claim 6, wherein in forming the likelihood function on the basis of the centered accumulated powers vector the apparatus is further configured to calculate weighed sums for each of a plurality of signal vectors using vectors of weights corresponding to predicted direct and reflected signal Doppler frequencies, obtain inverse matrices of the matrices formed on the basis of pairwise scalar products of weights vectors, and calculate the likelihood function as a quadratic form with the weighed sums and the inverse matrices.

10. The apparatus of claim 6, wherein in forming the likelihood function on the basis of the centered accumulated powers vector the apparatus is further configured to calculate weighed sums for each of a plurality of signal vectors using orthonormalized vectors of signals depending on Doppler frequencies of direct and reflected signals, and calculate the likelihood function by calculating a sum of obtained weighed sums squares.

* * * * *